United States Patent
Jetcheva et al.

(10) Patent No.: US 9,983,610 B2
(45) Date of Patent: May 29, 2018

(54) LATENCY-BASED MICRO DEMAND RESPONSE

(71) Applicant: FUJITSU LIMITED, Kawasaki-shi, Kanagawa (JP)

(72) Inventors: Jorjeta Jetcheva, San Jose, CA (US); Wuhan Desmond Cai, Pasadena, CA (US)

(73) Assignee: FUJITSU LIMITED, Kawasaki (JP)

( * ) Notice: Subject to any disclaimer, the term of this patent is extended or adjusted under 35 U.S.C. 154(b) by 720 days.

(21) Appl. No.: 14/586,315

(22) Filed: Dec. 30, 2014

(65) Prior Publication Data
US 2016/0187907 A1    Jun. 30, 2016

(51) Int. Cl.
*G05F 1/66* (2006.01)
*G05B 15/02* (2006.01)

(52) U.S. Cl.
CPC .............. *G05F 1/66* (2013.01); *G05B 15/02* (2013.01)

(58) Field of Classification Search
CPC ... G05F 1/66; G05F 1/67; G05B 15/02; H02J 2003/143; H02J 1/14; H02J 1/12; H02J 1/28
See application file for complete search history.

(56) References Cited

U.S. PATENT DOCUMENTS

2008/0177678 A1* 7/2008 Di Martini ............ G01D 4/002
                                                                    705/412
2013/0345888 A1* 12/2013 Forbes, Jr. ................ H02J 3/14
                                                                    700/291

OTHER PUBLICATIONS

Mathieu, Johanna, et al. "State estimation and control of electric loads to manage real-time energy imbalance." Power Systems, IEEE Transactions on , vol. 28, No. 1, pp. 430-440, Feb. 2013.
Meyn, Sean, et al. "Ancillary service to the grid from deferrable loads: the case for intelligent pool pumps in Florida." Decision and Control (CDC), 2013 IEEE 52nd Annual Conference on , vol., No., pp. 6946-6953, Dec. 10-13, 2013.
Hao, He, et al. "A generalized battery model of a collection of thermostatically controlled loads for providing ancillary service." Annual Allerton Conference, Oct. 2013.
Alizadeh, Mahnoosh, et al. "Least laxity first scheduling of thermostatically controlled loads for regulation services." GlobalSIP Conference, Dec. 2013.

(Continued)

*Primary Examiner* — Nathan L Laughlin
(74) *Attorney, Agent, or Firm* — Maschoff Brennan

(57) ABSTRACT

A method includes separating a collection of devices configured for participation in a DR event into an On-to-Off DR device set (On-to-Off set) and an Off-to-On DR device set (Off-to-On set). The method includes portioning into transition groups devices of the On-to-Off set and/or devices of the Off-to-On set based at least partially on latency involved in command communication with one or more of the devices. The method includes scheduling state transitions of the transition groups such that an energy curtailment during the state transitions meets a curtailment margin of a total curtailment of the DR event. The method includes executing a micro DR event that includes the state transitions in which the devices in the transition groups are transitioned from a current state to an alternative state and the micro DR event curtails a portion of a total energy curtailment for the DR event.

20 Claims, 19 Drawing Sheets

(56) References Cited

OTHER PUBLICATIONS

Sullivan, Michael, et al. "Using residential AC load control in grid operations: PG&E's ancillary service pilot." Smart Grid, IEEE Transactions on 4.2 (Jun. 2013): 1162-1170.

Pruckner, Marco, et al. "A Study on the impact of packet loss and latency on real-time demand response in smart grid." Globecom Workshops Dec. 2012.

Guo, Feng, et al. "Comprehensive real-time simulation of the smart grid." Industry Applications, IEEE Transactions on , vol. 49, No. 2, pp. 899-908, Mar. 2013.

Pourmousavi, S. Ali, et al. "Real-time central demand response for primary frequency regulation in microgrids." Smart Grid, IEEE Transactions on , vol. 3, No. 4, pp. 1988-1996, Dec. 2012.

* cited by examiner

200A

| | 202A | | | | 202B | | | | 202C |
|---|---|---|---|---|---|---|---|---|---|
| LATENCY | 55 | 53 | 49 | 46 | 45 | 40 | 39 | 33 | 31 | 10 |
| CURTAILMENT CAPACITY | 6 | 6 | 10 | 4 | 2 | 4 | 3 | 4 | 13 | 1 |
| DEVICE ID | D3 | D2 | D1 | D4 | D9 | D6 | D8 | D7 | D5 | D10 |

200B

| | 202A | | | | 202B | | | | 202C |
|---|---|---|---|---|---|---|---|---|---|
| LATENCY | 49 | 53 | 55 | 46 | 31 | 40 | 33 | 39 | 45 | 10 |
| CURTAILMENT CAPACITY | 10 | 6 | 6 | 4 | 13 | 4 | 4 | 3 | 1 | 1 |
| DEVICE ID | D1 | D2 | D3 | D4 | D5 | D6 | D7 | D8 | D9 | D10 |

200C

| | 202D | | | 202E | | | | 202F | |
|---|---|---|---|---|---|---|---|---|---|
| LATENCY | 60 | 55 | 53 | 49 | 44 | 40 | 35 | 25 | 18 | 12 |
| CURTAILMENT CAPACITY | 11 | 7 | 8 | 8 | 6 | 4 | 1 | 7 | 2 | 10 |
| DEVICE ID | E5 | E3 | E9 | E1 | E7 | E6 | E10 | E8 | E4 | E2 |

200D

| | 202D | | | 202E | | | | 202F | |
|---|---|---|---|---|---|---|---|---|---|
| LATENCY | 60 | 53 | 55 | 49 | 25 | 44 | 40 | 35 | 12 | 18 |
| CURTAILMENT CAPACITY | 11 | 8 | 7 | 8 | 7 | 6 | 4 | 1 | 10 | 2 |
| DEVICE ID | E5 | E9 | E3 | E1 | E8 | E7 | E6 | E10 | E2 | E4 |

| | 204A | | | | 204B | | | | 204C |
|---|---|---|---|---|---|---|---|---|---|
| LATENCY | 49 | 53 | 55 | 46 | 31 | 40 | 33 | 39 | 45 | 10 |
| CURTAILMENT CAPACITY | 10 | 6 | 6 | 4 | 13 | 4 | 4 | 3 | 1 | 1 |
| DEVICE ID | D1 | D2 | D3 | D4 | D5 | D6 | D7 | D8 | D9 | D10 |
| GROUP LATENCY | 55 | | | | 45 | | | | | 10 |

200F

| | 204D | | | | 204E | | | | | 204F |
|---|---|---|---|---|---|---|---|---|---|---|
| LATENCY | 60 | 53 | 55 | 49 | 25 | 44 | 40 | 35 | 12 | 18 |
| CURTAILMENT CAPACITY | 11 | 8 | 7 | 8 | 7 | 6 | 4 | 1 | 10 | 2 |
| DEVICE ID | E5 | E9 | E3 | E1 | E8 | E7 | E6 | E10 | E2 | E4 |
| GROUP LATENCY | 60 | | | | 44 | | | | | 18 |

FIG. 2B

| ON-TO-OFF SET TRANSITION GROUPS | GROUP LATENCY | OFF-TO-ON SET TRANSITION GROUPS | GROUP LATENCY | TRANSITION GROUP PAIR |
|---|---|---|---|---|
| FIRST TRANSITION GROUP 204A | 55 | FOURTH TRANSITION GROUP 204D | 60 | FIRST TRANSITION GROUP PAIR 206A |
| SECOND TRANSITION GROUP 204B | 45 | FIFTH TRANSITION GROUP 204E | 44 | SECOND TRANSITION GROUP PAIR 206B |
| THIRD TRANSITION GROUP 204C | 10 | SIXTH TRANSITION GROUP 204F | 18 | THIRD TRANSITION GROUP PAIR 206C |

| LATENCY | 50 | 45 | 30 | 18 | 14 | 10 |
|---|---|---|---|---|---|---|
| CURTAILMENT CAPACITY | 6 | 10 | 4 | 4 | 13 | 1 |
| DEVICE ID | F3 | F1 | F6 | F2 | F5 | F4 |

400B

| LATENCY | 55 | 53 | 49 | 45 | 40 | 10 |
|---|---|---|---|---|---|---|
| CURTAILMENT CAPACITY | 6 | 6 | 10 | 2 | 4 | 1 |
| CUMULATIVE LOAD | -29 | -23 | -17 | -7 | -5 | -1 |
| DEVICE ID | G3 | G2 | G1 | G4 | G6 | G5 |

| LATENCY | 55 | 53 | 50 | 49 | 45 | 45 | 40 | 30 | 18 | 10 | 10 |
|---|---|---|---|---|---|---|---|---|---|---|---|
| CURTAILMENT CAPACITY | 6 | 6 | 6 | 10 | 10 | 2 | 4 | 4 | 4 | 1 | 1 |
| CUMULATIVE LOAD | -4 | 2 | 8 | 2 | 12 | 2 | 4 | 8 | 4 | 0 | -1 |
| DEVICE ID | G3 | G2 | F3 | G1 | F1 | G4 | G6 | F6 | F2 | F4 | G5 |

400E

| 404A | | | | | | | | | | | 404B |
|---|---|---|---|---|---|---|---|---|---|---|---|
| 55 | 53 | 49 | 45 | 40 | 10 | 50 | 45 | 30 | 18 | 10 | 14 |
| 6 | 6 | 10 | 2 | 4 | 1 | 6 | 10 | 4 | 4 | 1 | 13 |
| G3 | G2 | G1 | G4 | G6 | G5 | F3 | F1 | F6 | F2 | F4 | F5 |

| LATENCY | 50 | 45 | 42 | 38 | 32 | 28 | 28 | 21 | 15 | 9 |
|---|---|---|---|---|---|---|---|---|---|---|
| CURTAILMENT CAPACITY | 6 | 10 | 4 | 10 | 8 | 1 | 10 | 10 | 8 | 1 |
| DEVICE ID | D3 | D1 | D6 | D7 | D5 | D10 | D9 | D8 | D4 | D2 |

600B

| | 602 | | 602 | | 602 | | | | |
|---|---|---|---|---|---|---|---|---|---|
| LATENCY | 55 | 53 | 49 | 45 | 40 | 30 | 23 | 18 | 10 | 10 |
| CURTAILMENT CAPACITY | 6 | 6 | 11 | 2 | 4 | 5 | 2 | 11 | 12 | 3 |
| DEVICE ID | E3 | E2 | E1 | E9 | E6 | E10 | E4 | E5 | E7 | E8 |

FIG. 6

@ 55 Seconds

@ 70 Seconds

(12) United States Patent
US 9,983,610 B2

LATENCY-BASED MICRO DEMAND RESPONSE

FIELD

The embodiments discussed herein are related to latency-based micro demand response.

BACKGROUND

Utilities incentivize curtailment of energy usage during certain high load periods to increase the ability of the utilities to meet a larger demand or to reduce production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes separating a collection of devices configured for participation in a Demand Response (DR) event into an On-to-Off DR device set (On-to-Off set) and an Off-to-On DR device set (Off-to-On set). The method includes portioning into one or more transition groups one or more devices of the On-to-Off set and/or one or more devices of the Off-to-On set. The portioning may be based at least partially on latency involved in command communication with one or more of the devices. The method includes scheduling state transitions of the transition groups such that an energy curtailment during the state transitions meet a curtailment margin of a total curtailment of the DR event. The method includes during a DR event duration, executing a micro DR event that includes the state transitions in which the devices in the transition groups are transitioned from a current state to an alternative state and the micro DR event curtails a particular curtailment amount that is a portion of a total energy curtailment for the DR event.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2A illustrates a portion of an example technique for execution of a micro DR event that may be implemented in the DR system of FIG. 1;

FIG. 2B illustrates a portion of an example technique for execution of the micro DR event that may be implemented in the DR system of FIG. 1;

FIG. 2C illustrates a portion of an example technique for execution of the micro DR event that may be implemented in the DR system of FIG. 1;

FIG. 4A illustrates a portion of another example technique for execution of a micro DR event that may be implemented in the DR system of FIG. 1;

FIG. 4C illustrates a portion of another example technique for execution of the micro DR event that may be implemented in the DR system of FIG. 1;

FIG. 6 illustrates another example technique for execution of a micro DR event that may be implemented in the DR system of FIG. 1;

DESCRIPTION OF EMBODIMENTS

Demand response (DR) events generally include periods in which a utility and/or a DR aggregator curtail or incentivize curtailment of energy usage. For instance, DR events may be implemented when energy prices provide a motive to curtail energy. In some circumstances such as DR systems implementing direct load control (DLC) programs, instead of executing a single DR event, multiple micro DR events may be executed to achieve a similar energy curtailment. The micro DR events may include state transitions (e.g., On-to-Off or Off-to-On) of one or more devices to which energy is supplied. Execution of the micro DR events may include scheduling the state transitions of the devices.

In some embodiments described herein, the scheduling of the state transitions of the devices may take into consideration latencies of the devices. Additionally, the scheduling of the state transitions of the devices may take into curtailment capabilities of the devices. By taking into consideration the latency and/or the curtailment capabilities of the devices, an amount of energy curtailed may be maintained at or below a particular level referred to herein as a curtailment margin. Accordingly, in these and other embodiments discussed herein, the state transitions of the devices may be scheduled such that a curtailment margin is met. This and other embodiments are described herein with reference to the appended drawings.

Figure 1:
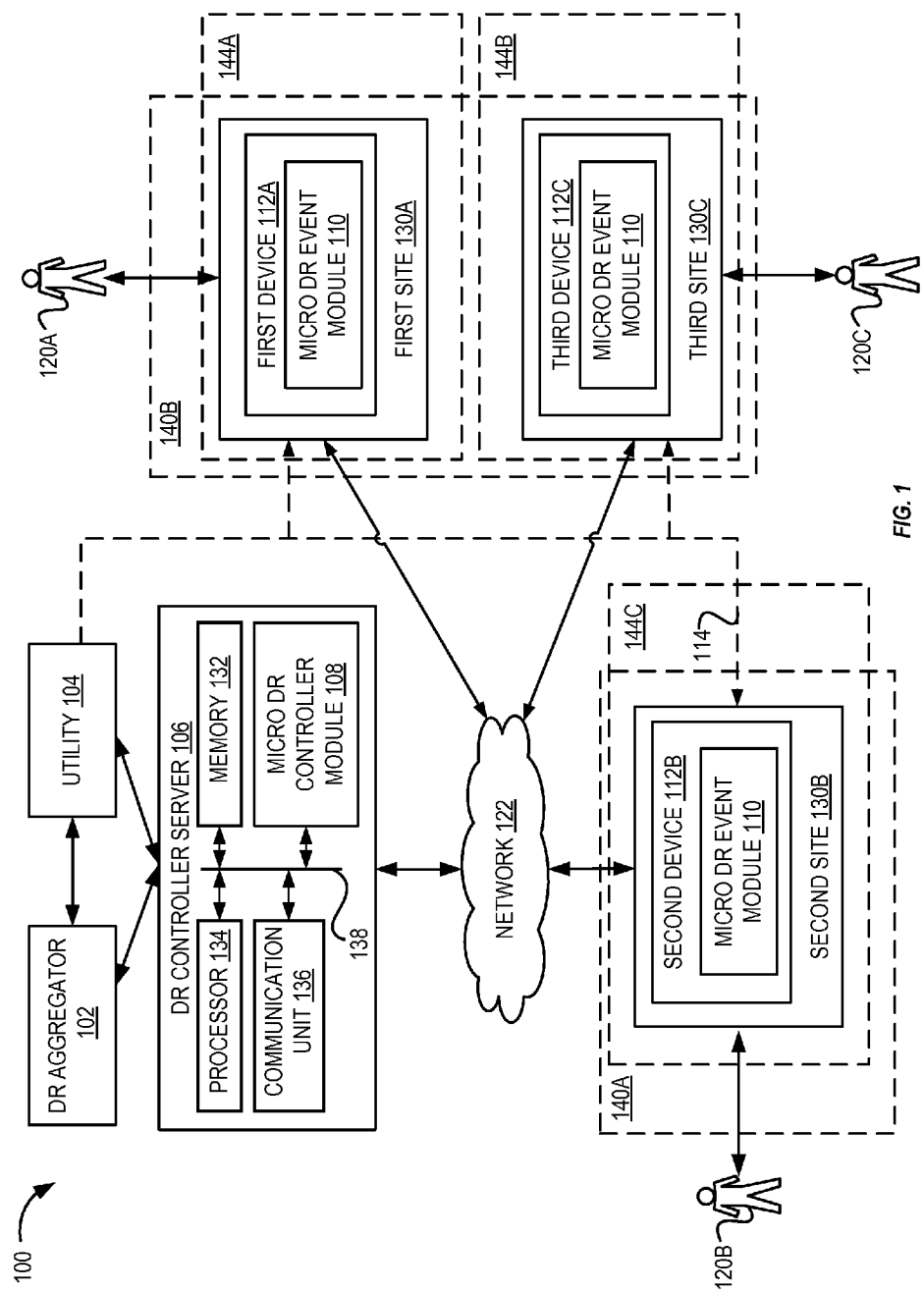
FIG. 1 is a block diagram of an example demand response (DR) system.

FIG. 1 is a block diagram of an example DR system 100, arranged in accordance with at least one embodiment described herein. In the DR system 100, a utility 104 and/or a DR aggregator 102 may implement or control implementation of a DR event through execution of one or more micro DR events. The DR event is distinguished herein from the micro DR event in that the DR event includes a series and/or sequence of micro DR events. In this application, the DR event is sometimes referred to as a macro DR event. Again, the macro DR event may include a series and/or sequence of micro DR events. Some additional details of relationships between the micro DR events and the (macro) DR events are provided elsewhere herein.

The micro DR events may involve one or more devices 112A-112C (generally, device 112 or devices 112) located at one or more sites 130A-130C (generally, site 130 or sites 130). When described together, the devices 112 may be referred to as a collection of the devices 112. In some embodiments, the collection of the devices 112 may be a subset of devices and/or sites (e.g., 112 and/or 130) to which the utility 104 supplies energy and/or is managed by the DR aggregator 102. The devices 112 included in the collection of the devices 112 may be configured for participation in DR events while one or more other devices and/or sites that are not included in the collection of the devices 112 may not be configured for participation in DR events.

Generally, a DR event may include a DR duration during which energy usage is curtailed. An example of the DR duration may include from 3:00 PM on Jan. 1, 2014 until 5:00 PM on Jan. 1, 2014. Additionally, the DR event may include a total curtailment, which may include a total curtailment during the DR event. An example of a total curtailment may include one megawatt-hour (MWh). The total curtailment may include a sum of curtailments by participating sites (e.g., the sites 130) and/or participating devices (e.g., 112). Accordingly, an example DR event may include a DR duration from 3:00 PM on Jan. 1, 2014 until 5:00 PM on Jan. 1, 2014. During the DR duration, the utility 104 and/or the DR aggregator 102 may coordinate the curtailment of one MWh in aggregate energy curtailment by the devices 112 and/or the sites 130.

In the DR system 100, rather than issuing one DR event with a DR duration and a total curtailment in which operation of the devices 112 is affected (e.g., ceased or reduced), the utility 104 and/or the DR aggregator 102 may issue two or more micro DR events. Each of the micro DR events may include a micro DR duration. For instance, if the DR duration may be about four hours, the DR duration may be separated into eight micro DR durations of about 30 minutes each. A sum of the micro DR durations may substantially equal the DR duration, may be greater than the DR duration, or may be less than the DR duration.

During the micro DR duration, operation of a first set of the devices 112 is ceased or reduced, and operation of a second set of the devices 112 is not affected. During a subsequent micro DR event, the operation of the second set of the devices 112 may be ceased or reduced, and the operation of the first set of the devices 112 may be returned to an operational or fully operational state. During a subsequent micro DR event, the operation of the first set of the devices 112 may be ceased or reduced, and the operation of the second set of the devices 112 may be returned to an operational or fully operational state. Similar operations may be performed for one or more subsequent micro DR events.

In some embodiments, one or more devices 112 included in one or both of the first set and the second set may be changed between subsequent micro DR events and/or between micro DR events in a series of micro DR events. In other embodiments, the devices 112 included in the first and the second set may be consistent throughout the series of micro DR events. Additionally, over time (e.g., between DR events or conditions in which DR events may be issued) the devices 112 included in the collection of the devices 112 and/or in one or both of the sets may be changed.

Ceasing or reducing operation of the devices 112 may curtail a particular curtailment amount. A sum of the particular curtailment amounts of the series of micro DR events may be substantially equal to the total curtailment. Thus, the utility 104 and/or the DR aggregator 102 may achieve the total curtailment by issuing the micro DR events.

A benefit of the micro DR events may include a reduction in interruption of the operation of the devices 112. For example, by periodically (e.g., during every other micro DR duration) interrupting operation, the overall function of the device 112 may not be affected. Similarly, one or more of the devices 112 may be included in a subset of a series of micro DR events without necessarily being included in another of the series of micro DR events. Thus, the utility 104 and/or the DR aggregator 102 may achieve a total curtailment by distributing curtailment among a large number of the devices 112, which may reduce perception of the curtailment by customers (e.g., 120).

In the DR system 100 of FIG. 1, a DR controller server (DR server) 106 may communicate with the devices 112 via a network 122 to execute the micro DR events. The utility 104 and/or the DR aggregator 102 may be associated with the DR server 106. The sites 130 and/or the devices 112 may be associated with customers 120A-120C (generally, customer 120 or customers 120). The term "associated with," when used herein may refer to a relationship between the DR aggregator 102 and/or the utility 104 and the DR server 106 or between the customers 120 and the sites 130 and the devices 112, may indicate ownership and/or control, directly or indirectly. For example, information communicated from the DR server 106 may be controlled by the utility 104 and/or the DR aggregator 102, and information communicated to the DR server 106 may be intended for the utility 104 and/or the DR aggregator 102. Each of these entities and systems are briefly introduced in the following paragraphs.

The network 122 may include wired or wireless, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

In the DR system 100, the utility 104 may distribute energy, which may include electricity, to the sites 130 and the devices 112. The distribution of the energy by the utility 104 to the sites 130 and the devices 112 is denoted in FIG. 1 at 114. The utility 104 may include any entity involved in production, transmission, and/or distribution of electricity. The utility 104 may be publicly owned or may be privately owned. Some examples of the utility 104 may include a power plant, an energy cooperative, and an independent system operator (ISO). The utility 104 may set terms for the micro DR events. For example, the utility 104 may set an incentive, a micro DR duration, a total curtailment, a curtailment margin (discussed elsewhere herein), and the like.

The sites 130 may include buildings, structures, equipment, or other objects that use energy distributed by the utility 104. The sites 130 may include multiple types of structures ranging from private residences to large industrial factories or office buildings. In some embodiments, the sites 130 included in the DR system 100 may be residences and/or small- and medium-size business (SMB) sites.

The sites 130 may include the devices 112. The devices 112 may include any device that consumes energy distributed by the utility 104 to the sites 130. Additionally or alternatively, the devices 112 may control operation of a device that consumes energy distributed by the utility 104.

For instance, the utility 104 may distribute energy to a first site 130A. A first device 112A may then consume the energy distributed to the first site 130A. Additionally or alternatively, the first device 112A may control consumption of the energy distributed by the utility 104 by another device. The first device 112A may affect operation of the other device such that the other device consumes (or does not consume) the energy distributed to the first site 130A. The devices 112 may include memory (e.g., a memory 132 described herein), a processor (e.g., a processor 134 described herein), and network communication capabilities (e.g., a communication unit 136 described herein).

The devices 112 may include a micro DR event module 110. The micro DR event module 110 may include code and routines configured for implementation of micro DR events as described herein. In some embodiments, the micro DR event module 110 may be implemented using hardware including, for example, a field-programmable gate array (FPGA) or an application-specific integrated circuit (ASIC). In some other instances, the micro DR event module 110 may be implemented using a combination of hardware and software.

The micro DR event module 110 may be configured to receive and implement communications received via the network 122 and/or communicate signals related to the devices 112 via the network 122. For example, a signal communicated from the DR server 106 to transfer state may be implemented at the device 112 by the micro DR event module 110. Additionally or alternatively, the micro DR event module 110 may communicate a confirmation signal to the DR server 106 following a change of state.

In some embodiments, the micro DR event module 110 may include routines configured to respond to signals sent in a DLC program. In a DLC program, the DR server 106 may directly control state transitions of the device 112. In other embodiments, the micro DR event module 110 may be configured to implement other types of DR programs. Some examples of the devices 112 may include a water heater, an air-conditioner (A/C), a heater, a piece of commercial or industrial equipment, a thermostat, a smart appliance, a controller for a piece of equipment, a pool heater, a household appliance, a refrigerator, a fan, a freezer, a ventilation unit, a thermostatically controlled unit, an appliance charging device, an electric vehicle charging device, a pool pump, and the like.

The customers 120 may include individuals, groups of individuals, or other entities. The sites 130 and the devices 112 may be associated with the customers 120. For example, a first customer 120A may be associated with the first site 130A and the first device 112A and a second customer 120B may be associated with a second site 130B and a second device 112B, etc. In some embodiments, the customers 120 may determine whether to participate in micro DR events and/or under what conditions a micro DR event may include a particular device 112. In other embodiments, the customers 120 may agree in advance to participate in or allow curtailment of the devices 112 in the micro DR events.

The DR aggregator 102 may include an entity that acts as an intermediary between the utility 104 and the sites 130 and/or the customers 120. An example of the role as the intermediary may include coordination and implementation of the micro DR events. For example, the DR aggregator 102 may coordinate the customers 120 such that total curtailment amounts may be achieved during one or more micro DR events. In addition, the DR aggregator 102 may identify the sites 130 and/or the customers 120 to include in the DR system 100. In some embodiments, criteria of the micro DR events and/or an incentive offered by the utility 104 may be communicated to the DR aggregator 102. The DR aggregator 102 may in turn communicate the criteria to the customers 120 and/or the sites 130 and offer some portion of the incentive to the sites 130 in exchange for participation in the micro DR events.

The sites 130 may be managed by the DR aggregator 102. The DR aggregator 102 may coordinate implementation of, or implement via the DR server 106, the micro DR events by the devices 112 it manages. In the depicted embodiment, the DR aggregator 102 may act as an intermediary as described above. In some embodiments, the DR aggregator 102 may be omitted and the utility 104 may directly implement the micro DR events via the DR server 106.

The DR server 106 may include a hardware server that includes the processor 134, the memory 132, the communication unit 136, and a micro DR controller module (controller module) 108. The processor 134, the memory 132, the communication unit 136, and the controller module 108 may be communicatively coupled by a bus 138.

The processor 134 may include an arithmetic logic unit (ALU), a microprocessor, a general-purpose controller, or some other processor array to perform one or more operations described herein. The processor 134 may be coupled to the bus 138 for communication with the other components (e.g., 108, 132, and 136). The processor 134 generally processes data signals. The processor 134 may include various computing architectures including a complex instruction set computer (CISC) architecture, a reduced instruction set computer (RISC) architecture, or an architecture implementing a combination of instruction sets.

Although the DR server 106 of FIG. 1 includes a single processor 134, multiple processors may be included in the DR server 106 in which the multiple processors may be configured to collectively or individually perform the operations of the DR server 106.

The memory 132 may be configured to store instructions and/or data that may be executed by the processor 134. The memory 132 may be coupled to the bus 138 for communication with the other components. The instructions and/or data may include code for performing the techniques or methods described herein. The memory 132 may include Dynamic Random Access Memory (DRAM), Static RAM (SRAM), flash memory, or any other applicable type of memory. In some embodiments, the memory 132 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 136 may be configured to transmit and receive data to and from the devices 112. The communication unit 136 may be coupled to the bus 138. In some embodiments, the communication unit 136 may include a port for direct physical connection to the network 122 or to another communication channel. For example, the communication unit 136 may include a universal serial bus (USB), standard definition (SD), CAT-5, or similar port for wired communication with the devices 112. In some embodiments, the communication unit 136 includes a wireless transceiver for exchanging data via communication channels using one or more wireless communication methods, including IEEE 802.11, IEEE 802.16, BLUETOOTH®, or another suitable wireless communication method.

In some embodiments, the communication unit 136 includes a cellular communications transceiver for sending and receiving data over a cellular communications network including via SMS, MMS, HTTP, direct data connection, WAP, e-mail, or another suitable type of electronic communication. In some embodiments, the communication unit 136 includes a wired port and a wireless transceiver. The communication unit 136 may also provide other conventional connections to the network 122 for distribution of files and/or media objects using standard network protocols including transmission control protocol/internet protocol (TCP/IP), HTTP, HTTP secure (HTTPS), and simple mail transfer protocol (SMTP), etc.

In the DR system 100, the controller module 108 of the DR server 106 may be configured to execute one or more micro DR events. Execution of the micro DR events may include signaling the first set of the devices 112 to perform a first state transition (e.g., On-to-Off) and signaling the second set of the devices 112 to perform a second state transition (e.g., Off-to-On). More generally, signaling by the DR server 106 may cause state transitions of one or more of the devices 112 from a current state to an alternative state. For example, the first device 112A may be in an On state (e.g., operating), which may be a current state of the first device 112A. The second device 112B may be in an Off state (e.g., not operating), which may be a current state of the second device 112B. A state transition of the first device 112A may transition the first device 112A to an Off state (e.g., not operating) such that the first device 112A performs an On-to-Off transition. Similarly, a state transition of the second device 112B may transition the second device 112B to an On state (e.g., operating) such that the second device 112B performs an Off-to-On transition.

In general, curtailing too much energy during the micro DR events is favored over not curtailing enough energy. Accordingly, during the micro DR events, the DR server 106 may schedule state transitions of the devices 112 to ensure that at least a particular amount of energy is consistently curtailed during each of the micro DR events and during transitions from one micro DR event to the next micro DR event. As used herein, the target particular amount of energy curtailed is referred to as a curtailment margin.

The curtailment margin may include a percentage or a portion of a total curtailment of a DR event or a micro DR event. For example, a DR event may include a DR duration of ten hours and a total curtailment of ten MWh. Accordingly, for each hour of the DR duration, one MWh may be curtailed. The DR event may be separated into ten micro DR events, each having a curtailment margin of one MWh. Accordingly, during the ten micro DR events, the total curtailment of ten MWh may be achieved.

The curtailment margin may be used to determine which devices 112 or combinations thereof are included in one or more micro DR events. Additionally, the curtailment margin may be used to determine a sequence in which the devices 112 or combinations thereof transition state.

In some circumstances, transition of one or more of the devices 112 and/or inclusion of one or more of the devices 112 into a group that transitions together may be based on a relationship between the curtailment margin (e.g., a value of the curtailment margin) and a curtailment capacity or a load of the one or more devices 112. For example, if a group of devices 112 is transitioning from an off state to an on state, then it may be desirable for the sum of the loads of the devices 112 in the group to be less than the curtailment margin. Thus, when the devices 112 in the group transition to the On state, the resulting load does not place the DR system 100 in a state in which an amount that is less than the curtailment margin is being curtailed. Additionally, if a group of devices 112 is transitioning from an on state to an off state, then it may be desirable for the sum of the curtailment capacities of the devices 112 in the group to be greater than or exceed the curtailment margin. Thus, when the devices 112 in the group all transition to the off state, the resulting curtailment capacity may place the DR system 100 in a state in which an amount more than the curtailment margin is being curtailed.

In some embodiments, the curtailment margin may include a safety parameter, which may include a value of between 0.1 and 0.3 of the curtailment margin for a DR event. The safety parameter may include a percentage of the curtailment margin. For instance, the safety parameter of 0.1 may increase the curtailment margin by ten percent. Additionally or alternatively, in some embodiments, the curtailment margin may be dynamic. A dynamic curtailment margin may change based upon curtailment capacities of the devices 112 during state transitions.

In the DR system 100 of FIG. 1, the DR server 106 may take into consideration latency of the devices 112. The latency of the devices 112 may include communication latency such as heterogeneous communication latencies, which may be inherent in deployments across WANs. The communication latency may include a delay in signal communication between the DR server 106 and one of the devices 112. For example, the DR server 106 may communicate a signal to the first device 112A via the network 122 and/or the first device 112A may communicate a confirmation signal to the DR server 106 via the network 122. The signal and/or the confirmation signal may be delayed due to network devices included in the network 122, network media, distances between the DR server 106 and the first device 112A, or some combination thereof.

Additionally or alternatively, the latency may include device latency. The device latency may include a time that it takes for the state of the device 112 to transition following reception of a signal to transition. For example, the DR server 106 may communicate the signal to the first device 112A via the network 122. The signal may be received at the first device 112A. Following reception of the signal, the first device 112A may take some time to transition from an On state to an Off state or vice versa.

The DR server 106 may be configured to consider the latency of the devices 112 when separating the collection of the devices 112 into the sets and/or into groups. Additionally, the DR server 106 may be configured to consider latency when ordering one or more of the devices 112 in the sets and/or groups.

In addition, the DR server 106 may be configured to consider the latency of the devices 112 to determine whether to execute one or more micro DR events. For example, in circumstances in which the latency of the devices 112 is longer than a DR duration or a micro DR duration, a micro DR event may not be executed.

In some embodiments, the DR server 106 may designate sets of the collection of the devices 112 as an On-to-Off set 140A and an Off-to-On set 140B. The On-to-Off set 140A may include the devices 112 that have a current state of an On state. When signaled by the DR server 106, the devices 112 in the On-to-Off set 140A may transition to an Off state. Similarly, the Off-to-On set 140B may include the devices 112 that include a current state of the Off state. When signaled by the DR server 106, the devices in the Off-to-On set 140B may transition to the On state. In FIG. 1, the second device 112B may be included in the On-to-Off set 140A and the first device 112A and a third device 112C may be included in the Off-to-On set 140B. In the embodiments discussed herein, the On-to-Off set 140A and the Off-to-On set 140B include other devices.

The DR server 106 may be configured to separate the collection of the devices 112 into the On-to-Off set 140A and the Off-to-On set 140B. Additionally, the DR server 106 may be configured to portion the devices 112 into one or more transition groups 144A-144C (generally, transition group 144 or transition groups 144). For example, the DR server 106 may be configured to portion into transition groups 114 the devices 112 of the On-to-Off set 140A and/or the devices of the Off-to-On set 140B into the transition groups 144 based at least partially on the latency of the devices 112. In FIG. 1, the transition groups 144 each include one of the devices 112. In some embodiments, the transition groups 144 may include one or more devices 112.

The DR server 106 may be configured to schedule state transitions of the transition groups 144. The state transitions may be scheduled such that an energy curtailment during the state transitions and throughout a DR event duration meets the curtailment margin. For example, the scheduling may include sequencing one or more of state transitions such that a first transition group formed of the On-to-Off set is transitioned prior to a second transition group formed of the Off-to-On set. The sequencing may thus help in an energy curtailment during any micro DR event and during the state transitions being below the curtailment margin by reducing instances where the devices of the first and second transition groups being on at substantially the same time.

During a DR event duration, the DR server 106 may execute one or more micro DR events that include the state transitions as scheduled. Each of the micro DR events may include additional state transitions in which the devices 112 in the transition groups 144 are transitioned between the current state to the alternative state. Additionally, each of the micro DR events curtails an additional curtailment amount. A sum of the additional curtailment amounts may be about equal to the total energy curtailment for a DR event.

In the DR system 100 of FIG. 1, the utility 104 may distribute energy to the sites 130. Accordingly, the micro DR events described with reference to FIG. 1 may include curtailment of electrical energy usage by the sites 130 and/or the devices 112. In some other embodiments, the utility 104 may provide another resource such as natural gas or water to the sites 130. Thus, in these other embodiments, the micro DR events may include curtailment of other resources. Moreover, in these and other embodiments, the devices 112 may include the devices 112 that may use another resource and accordingly be curtailed from use during micro curtailment events.

Modifications, additions, or omissions may be made to the DR system 100 without departing from the scope of the present disclosure. Specifically, embodiments depicted in FIG. 1 include three customers 120, three sites 130 each including one device 112, one DR server 106, one DR aggregator 102, and one utility 104. The present disclosure may apply to DR systems that may include one or more of the customers 120, one or more of the sites 130 each including one or more of the devices 112, one or more of the utilities 104, one or more of the DR aggregators 102, one or more of the DR servers 106, or any combination thereof. The present disclosure may also apply to DR systems in which energy or any other resource may be curtailed.

Moreover, the separation of various components in the embodiments described herein is not meant to indicate that the separation occurs in all embodiments. It may be understood with the benefit of this disclosure that the described components may be integrated together in a single component or separated into multiple components.

Figure 3:
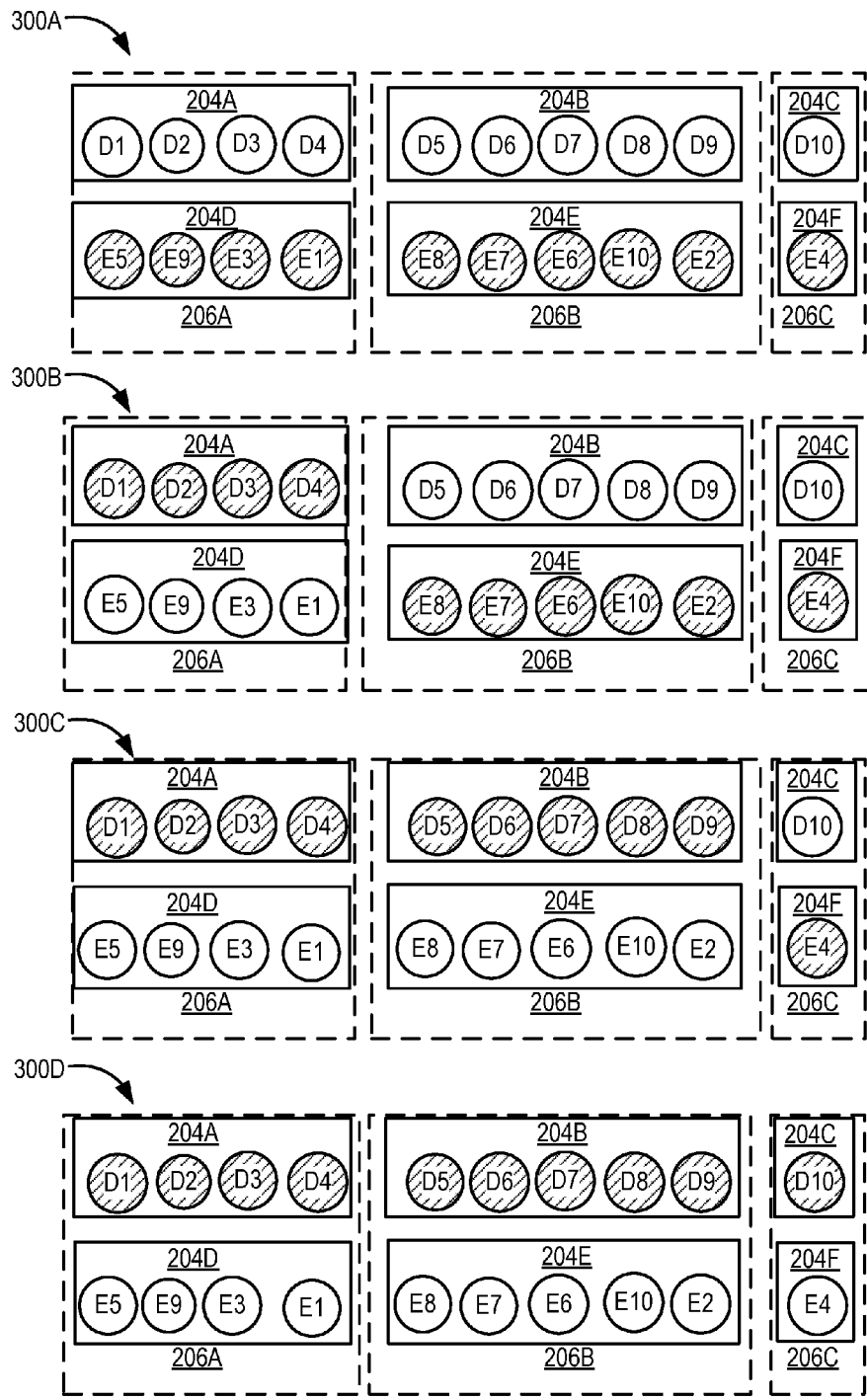
FIG. 3 depicts a sequence of transition states according to an example portioning of FIGS. 2A-2C.

FIGS. 2A-3 illustrate an example technique for execution of a micro DR event that may be implemented in the DR system 100 of FIG. 1. FIGS. 2A-2C depict tables 200A-200G that present an example portioning of an example collection of devices D1-D10 and E1-E10. FIG. 3 depicts a sequence of transition states 300A-300D according to the portioning of FIGS. 2A-2C.

With reference to FIG. 2A, a collection of devices may include devices having device identifiers (device ID) D1-D10 and E1-E10. The devices D1-D10 and E1-E10 may be substantially similar to the devices 112 described with reference to FIG. 1. The collection of the devices D1-D10 and E1-E10 may be separated into an On-to-Off set, which may include the devices D1-D10, and into an Off-to-On set, which may include the devices E1-E10.

Tables 200A and 200B include the devices D-D10 (e.g., the On-to-Off set) and tables 200C and 200D include devices E1-E10 (e.g., the Off-to-On set). Each of the tables 200A-200D include categories that are descriptive of the devices D1-D10 and E1-E10. The categories include latency, curtailment capacity, and device ID. The latency includes a time measurement indicative of the latency of implementing a state change in a device. The curtailment capacity includes an amount of electrical energy a device when transitioned to an Off state curtails. The device ID is the device identifier. For example, with reference to the table 200A, a device D3 includes a curtailment capacity of six and a latency of 55. The numerical values in the tables 200A-200D are used for illustrative purposes and do not represent an actual circumstance. However, an appropriate unit for curtailment capacity may include kilowatt-hours (kwh) or another power unit and an appropriate unit for latency may include seconds (s).

In the tables 200A and 200C, the On-to-Off set D1-D10 and the Off-to-On set E1-E10 may be sorted according to the latency of each of the devices. For example, in the table 200A, the device D3 includes a higher latency than a device D2, which includes a higher latency than the device D1, etc. A similar sorting is depicted in the table 200C in which a device E5 includes a higher latency than a device E3, which has a higher latency than a device E9, etc.

In some embodiments, the On-to-Off set D1-D10 and the Off-to-On set E1-E10 may be sorted in descending or non-increasing order. Non-increasing order may include circumstances in which two devices (e.g., D1-D10 or E1-E10) include substantially the same latency. In these circumstances, a table (e.g., 200A or 200C) may include sorted devices that may not decrease in latency.

One or more latency groups 202A-202F (generally, latency group 202 or latency groups 202) may be created. The latency groups 202 may be based on curtailment capabilities of the devices D1-D10 and E1-E10. For example, the devices may be added to each of the latency groups 202 until a sum of the curtailment capabilities of each subset of devices included in each of the latency groups 204 is greater than or equal to the curtailment margin or an adjusted curtailment margin.

In some embodiments, an adjusted curtailment margin may be calculated according to an example adjusted margin equation:

$$C_{adj} = (1+(x)) \times C_m$$

In the adjusted margin equation, $C_{adj}$ represents the adjusted curtailment margin. The variable $x$ represents the safety factor. The variable $C_m$ represents the curtailment margin.

In the example depicted in FIGS. 2 and 3, a curtailment margin may be equal to 20 and a safety factor may be 0.3. Accordingly, the adjusted curtailment margin may be equal to 26. Thus, to create a first latency group 202A, the device D3 may be added, which includes a curtailment capacity of 6. Then, the device D2 may be added to the first latency group 202A. The device D2 includes a curtailment capacity of six, which makes the sum of the curtailment capacities in the first latency group 202A equal to 12. The device D1 may then be added to the first latency group 202A, which may make the sum of the curtailment capacities in the first latency group 202A equal to 22. When a device D4 is added to the first latency group 202A, the sum of the curtailment capacities is equal to 26, which is the adjusted curtailment margin. With the addition of the device D4, the first latency group 202A may be full.

Latency groups 202B, 202D, and 202E are created in a similar fashion. Latency groups 202C and 202F include any leftover devices (e.g., D10 in 202C and E4 and E2 in 202F). Accordingly, in at least some circumstances, the latency groups 202 that include devices having the lowest latencies may not equal or be greater than the curtailment margin or adjusted curtailment margin.

In addition, referring back to the first latency group 202A, in another example the curtailment capacity of the device D4 may be five rather than four. In this example, the addition of the device D4 may result in the sum of the curtailment capacities in the first latency group 202A to equal 27, which is greater than the adjusted curtailment capacity. Thus, the device D4 may be the last device included in the first latency group.

The latency groups 202 may then be sorted according to the curtailment capability of the subset of the devices (e.g., D1-D10 and E1-E10) included in each of the latency groups 202. For example, referring to the tables 200B and 200D, the first latency group 202A includes the devices D3, D2, D1, and D4. In the table 200A, these devices D3, D2, D1, and D4 are sorted according to latency. In the table 200B, these devices D3, D2, D1, and D4 are sorted according to curtailment capacity. In some embodiments, the devices may be sorted according to curtailment capacity in non-increasing order. For instance, referring to the table 200B, the device D1 includes a higher curtailment capacity than the device D2, which includes an equal curtailment capacity than the device D3, which includes a higher curtailment capacity than the device D1. The latency groups 202B-202F may be sorted similarly.

With reference to FIG. 2B, a table 200E includes the devices D1-D10, which may include the On-to-Off set and a table 200F includes the devices E1-E10, which may include the Off-to-On set. As in the tables 200A-200D, the tables 200E and 200F include the categories that are descriptive of the devices D1-D10 and E1-E10. In addition, the tables 200E and 200F include a transition group latency. The group latency may include a latency computed for each transition group 204A-204F (generally, transition group 204 or transition groups 204). In these and other embodiments, the group latency may include a highest latency of one of the devices included in each of the transition groups 204. Some additional details of the transition group latency are provided elsewhere herein.

The devices D1-D10 and E1-E10 may be portioned to create one or more of the transition groups 204, which are depicted in the tables 200E and 200F. In some embodiments, the transition groups 204 may be created differently for the On-to-Off set (e.g., the devices D1-D10) than for the Off-to-On set (e.g., E1-E10). For example, for the On-to-Off set, the devices may be added to each of the transition groups 204 such that a sum of the curtailment capabilities of each transition group 204 approaches the curtailment margin or the adjusted curtailment margin, but does not exceed it. Additionally, for the Off-to-On set, devices may be added to each of the transition groups 204 until a sum of the curtailment capabilities of each transition group 204 exceeds the curtailment margin or the adjusted curtailment margin.

For example, in the table 200E, a sum of the curtailment capacities in each of the transition groups 204A, 204B, and 204C does not exceed the adjusted curtailment margin of 26. The latency groups 202A, 202B, and 202C of the tables 200A and 200B coincide with the transition groups 204A, 204B, and 204C. However, in these and other embodiments, the latency groups 202 may be disregarded when creating the transition groups 204.

In the table 200F, transition groups 204D, 204E, and 204F do not coincide with the latency groups 202D, 202E, and 202F of the tables 200C and 200D. For example, in a fourth transition group 204D, including the devices E5, E9, and E3 create a transition group 204 with a sum of the curtailment capacities of 26. A value of 26 does not exceed the adjusted curtailment capacity of 26. Accordingly, the device E1 is also included in the fourth transition group 204D. A fifth transition group 204E begins with a device E8 and continues until a sum of the curtailment capacities exceeds the adjusted curtailment margin.

A third transition group 204C and a sixth transition group 204F may include devices (e.g., D10 and E4) having lowest curtailment capacities. The transition groups 204 including the devices having the lowest curtailment capacities may include any leftover devices. Accordingly, a sum of the curtailment capacities in the transition groups 204 having the devices having the lowest curtailment capacities may not exceed the adjusted curtailment margin or adjusted curtailment margin.

As depicted in the tables 200E and 200F, the group latency may be computed for each of the transition groups 204. In this embodiment, the group latency may include a highest latency of one of the devices included in each of the transition groups 204. In other embodiments, the group latency may include an average of the latencies of the devices, a weighted average of the latencies of the devices, or another suitable group latency. The transition groups 204 may be sorted according to group latency in non-increasing order. For example, in the tables 200E and 200F, the transition groups 204 are sorted in non-increasing order based on group latencies.

FIG. 2C depicts a table 200G. The table 200G depicts the transition groups 204 sorted according to group latency in non-increasing order. One or more transition group pairs 206A-206C (generally, transition group pair 206 or transition group pairs 206) may be created. In this and other embodiments, one or more of the transition group pairs 206 include one of the transition groups 204 of the On-to-Off set (e.g., the devices D1-D10) and one of the transition groups of the Off-to-On set (e.g., the devices E1-E10).

In some embodiments, one or more transition group pairs 206 may be created from the transition groups 204 and one transition group 204 may be left over. In these embodiments, one of the transition groups 204 may not be included in a transition group pair.

FIG. 3 depicts indicators labeled D1-D10 and E1-E10 during an example sequence of transition states 300A-300D according to the example portioning of FIGS. 2A-2C. The transition states 300A-300D may be included in execution of a micro DR event. In general, the execution of a micro DR event may include communicating signals to transition state to one or more of the devices in each of the transition group pairs 206 in an order. After the devices in a first of the transition group pairs 206 has completed transition (e.g., from a current state to an alternative state), signals to transition state may be communicated to one or more of the devices in a next pair of the transition group pairs 206.

In each of the transition states 300A-300D, the indicators that are white designate devices in an On state. The indicators that include a diagonal-lined fill designate devices in an Off state. For example, a first transition state 300A depicts an initial state. In the initial state, the On-to-Off set D1-D10 are in the On state and the Off-to-On set are in the Off state.

Between the first transition state 300A and a second transition state 300B, signals to transition state may be communicated to a first transition group pair 206A (e.g., the devices D1, D2, D3, D4, E5, E9, E3, and E1). In the second transition state 300B, the first transition group pair 206A has transitioned its state. A second transition group pair 206B and a third transition group pair 206C are in the state of the first transition state 300A.

After the first transition group pair 206A has transitioned and between the second transition state 300B and a third transition state 300C, signals to transition state may be communicated to the second transition group pair 206B (e.g., devices D5, D6, D7, D8, D9, E8, E7, E6, E10, and E2). In the third transition state 300C, the first and second transition group pairs 206A and 206B have transitioned state. The third transition group pair 206C is in the state of the first transition state 300A.

After the second transition group pair 206B has transitioned and between the third transition state 300C and a final transition state 300D, signals to transition state may be communicated to the third transition group pair 206C (e.g., the devices D10 and E4). In the final transition state 300D, the first, second, and third transition group pairs 206A-206C have transitioned their states.

Figure 4B:
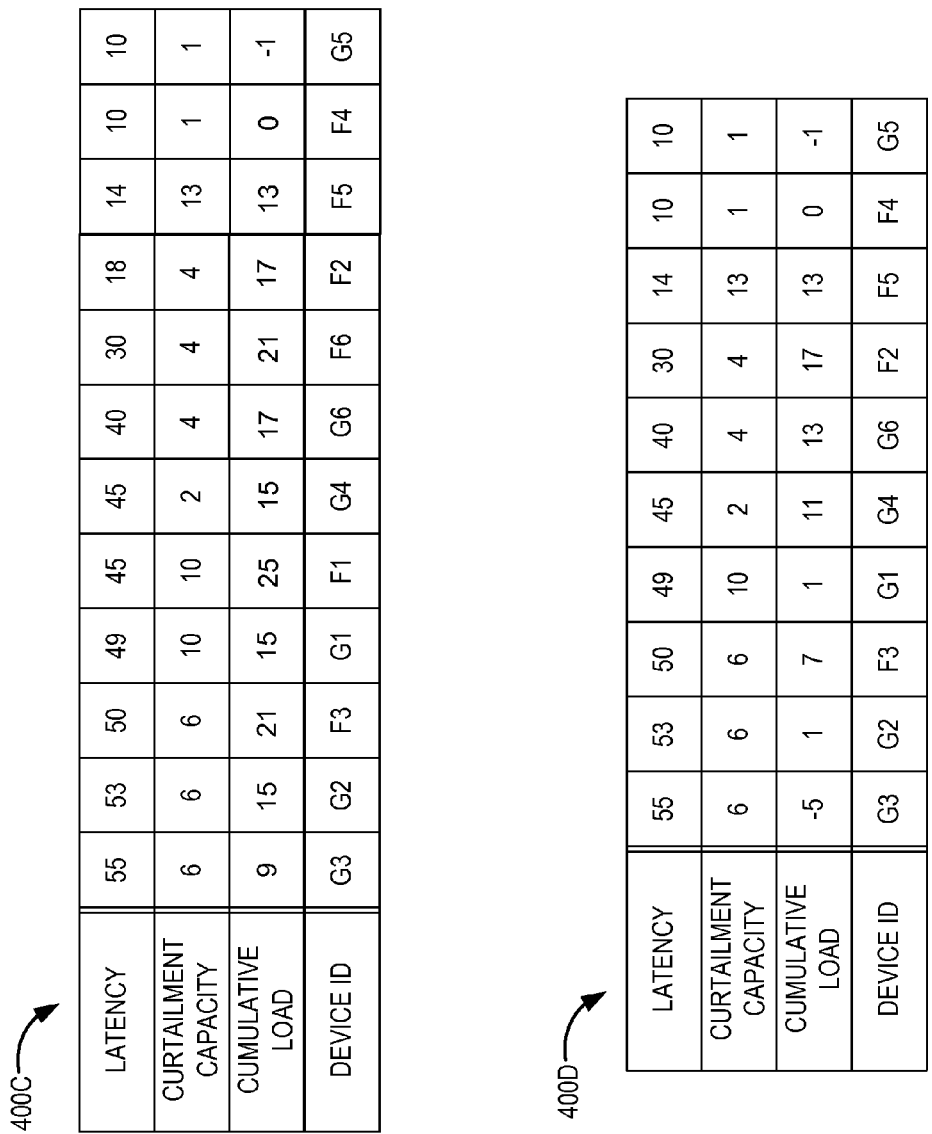
FIG. 4B illustrates a portion of another example technique for execution of the micro DR event that may be implemented in the DR system of FIG. 1.
Figure 5:
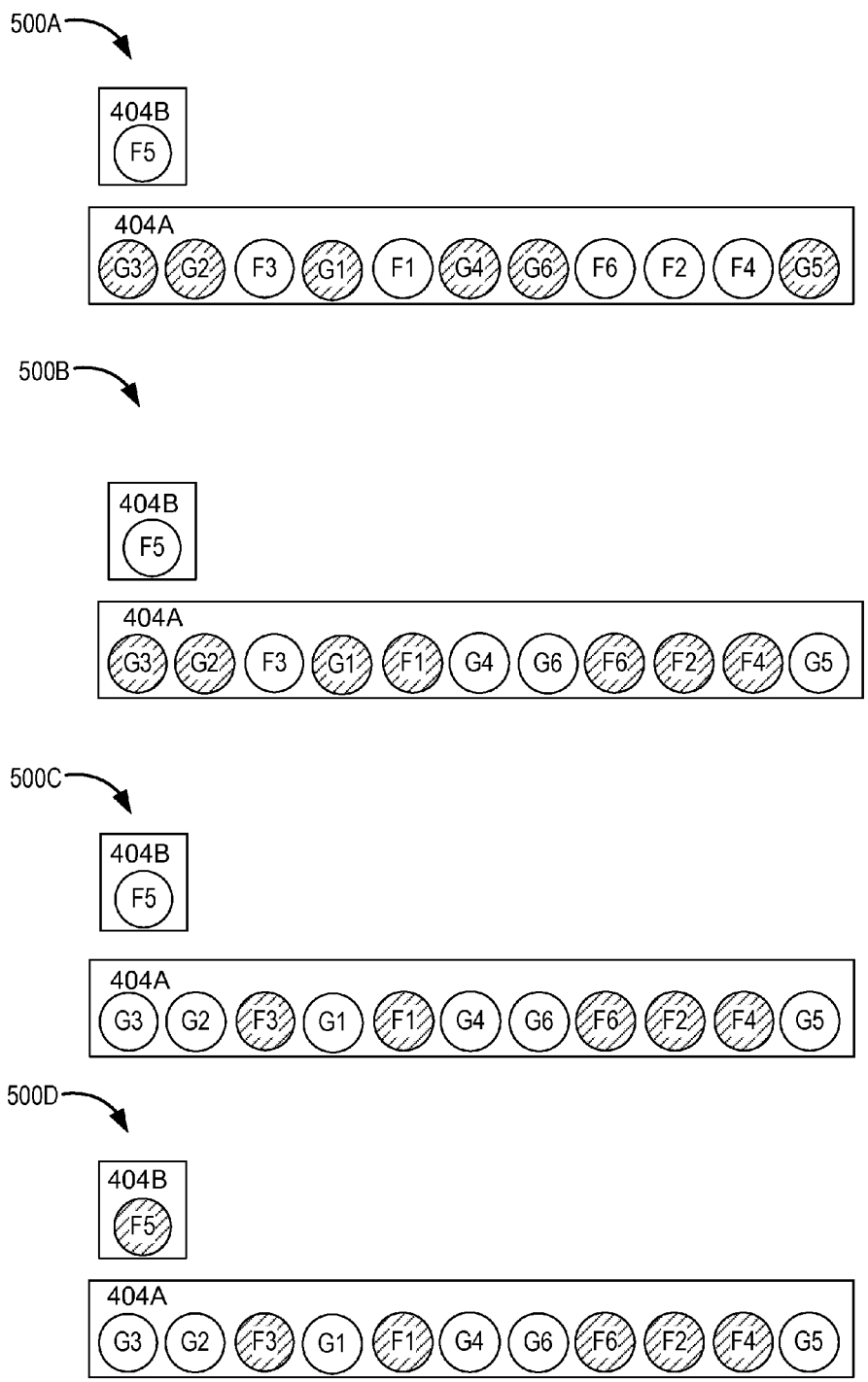
FIG. 5 depicts a sequence of transition states according to an example portioning described with reference to FIGS. 4A-4C.

FIGS. 4A-5 illustrate another example technique for execution of a micro DR event that may be implemented in the DR system 100 of FIG. 1. For example, the DR server 106 of FIG. 1 may implement the technique discussed with reference to FIGS. 4A-5. FIGS. 4A-4C depict tables 400A-400F that present another example portioning of an example collection of devices F1-F6 and G1-G6. FIG. 5 depicts a sequence of transition states 500A-500D according to the portioning described with reference to FIGS. 4A-4C.

With reference to FIG. 4A, the collection of the devices F1-F6 and G1-G6 may be separated into the Off-to-On set, which may include the devices F1-F6, and into the On-to-Off set, which may include the devices G1-G6. The Off-to-On set may be organized into a table 400A. The table 400A may include three categories that are descriptive of the devices F1-F6. The categories may include latency, curtailment capacity, and device ID, which are as described above with respect to the table 200A of FIG. 2A. The table 400A may include the Off-to-On set sorted by the latency of the devices F1-F6. The devices F1-F6 may be sorted by the latency in non-increasing order. For example, a device F3 may have a higher latency than the device F1, which may have a higher latency than the device F6, etc.

The On-to-Off set may be organized into a table 400B. The table 400B may include the three categories: latency, curtailment capacity, and device ID that are descriptive of the devices G1-G6 as described elsewhere herein. In addition, the table 400B may include a category of cumulative load. The cumulative load may include a sum of the curtailment capacities of the devices G1-G6 beginning with the device (in this example, a device G5) having the lowest latency. The cumulative load may also be indicative of a total load or curtailment at a particular time, which may be indicated by the latency.

For example, in the table 400B, the device G5 may have the lowest latency, followed by the device G6, followed by a device G4, etc. The cumulative load of the device G4 at 45 seconds (e.g., the latency of the device G4) may include a sum of the curtailment capacities of the devices G4, G5, and G6, which in this example is equal to seven (e.g., 1+4+2). In this and other embodiments, cumulative loads may be presented as negative numbers and positive numbers. The cumulative loads presented as negative numbers may be indicative of a load deficit introduced from a state transition. For instance, a device transitioning from an On state to an Off state curtails energy, which may create a deficiency. In contrast, a device transitioning from an Off state to an On state introduces an additional load, which may be represented by a positive number.

With reference to FIGS. 4B and 4C, tables 400C-400E depict an example of merging a portion of the Off-to-On set (e.g., the devices F1-F6) with the On-to-Off set (e.g., the devices G1-G6) to create a merge group. The merged group may include a subset of the devices F1-F6 and G1-G6 that may be signal at substantially the same time and may maintain the energy curtailment below the curtailment margin. The tables 400C-400E include the categories of latency, curtailment capacity, cumulative load, and device ID as described elsewhere herein.

The table 400C depicts the Off-to-On set (e.g., the devices F1-F6) merged with the On-to-Off set (e.g., the devices G1-G6) without regard to the cumulative load. In this example, the curtailment margin may be equal to 20. Accordingly, the cumulative load may exceed the curtailment margin unless the one or more of the Off-to-On set are excluded from the merged group.

The merged group may be formed taking into consideration the latency involved in state transitions of each of the devices F1-F6 and G1-G6 and the cumulative load resulting from inclusion of each of the devices F1-F6 of the Off-to-On set into the merged group. For example, to add one of the devices F1-F6 to the merged group, at the time in which the devices F1-F6 transition state, the cumulative load may not exceed the curtailment margin. A table 400D depicts a merged group in which the curtailment margin of 20 is not exceeded. The devices F1 and F6 are excluded from this example of the merged group.

In some embodiments, the merged group may be formed to maximize a number of the devices F1-F6 from the Off-to-On set included in the merged group. In these and other embodiments, to form the merged group, each of the devices F1-F6 may be considered for inclusion beginning with the devices F1-F6 having the lowest latency. The cumulative loads may be computed as if the devices F1-F6 under consideration are placed in the merged group. The cumulative loads resulting from inclusion of remaining devices F1-F6 may be further computed. If the cumulative load exceeds the curtailment margin at any time, the merged group may be re-formed without the devices F1-F6 under consideration.

For example, the table 400E depicts a merged group in which a maximum number of the devices F1-F6 are included. The cumulative load does not exceed the curtailment margin of 20. Additionally, instead of Off-to-On devices F1 and F6 being excluded as in the embodiment illustrated in the table 400D, only a device F5 is excluded from the merged group of the table 400E.

With reference to FIG. 4C, based on the merged group, two transition groups 404A and 404B may be created. A first transition group 404A may include the merged group and a second transition group 404B may include the devices of the Off-to-On set that are not included in the merged group, which may include, in this example, the device F5.

FIG. 5 depicts indicators labeled F1-F6 and G1-G6 during an example sequence of transition states 500A-500D according to the example portioning of FIGS. 4A-4C. The transition states 500A-500D may be included in execution of a micro DR event. In general, the execution of a micro DR event may include communicating signals to transition the state of one or more of the devices F1-F6 and G1-G6 in each of the transition groups 404A or 404B in an order.

In each of the transition states 500A-500D, the indicators that are white designate devices in an On state. The indicators that include a diagonal-lined fill designate devices in an Off state. For example, a first transition state 500A depicts an initial state. In the initial state, the On-to-Off set F1-F6 are in the On state and the Off-to-On set G1-G6 are in the Off state. In general, executing a micro DR event using the technique disclosed in FIGS. 4A-5 includes signaling the devices in the merged group, which includes all devices in the On-to-Off set (G1-G6) and the devices included in the portion of the Off-to-On set merged with the On-to-Off set (e.g., F1-F4 and F6). The signaling to the merged group may include signaling the devices to transition their states. Following transition state completion of the merged group, the execution may include signaling a portion of the Off-to-On set not merged with the On-to-Off set.

For instance, between the first transition state 500A and a second transition state 500B, signals to transition state may be communicated to the first transition group 404A (e.g., devices G3, G2, F3, G1, F1, G4, G6, F6, F2, F4, and G5). The second transition state 500B includes a transition state at between 45 seconds and 49 seconds. Accordingly, the devices G5, F4, F2, F6, G6, G4, and F1 have transitioned their states and the devices G1, F3, G2, and G3 have not transitioned their states. A third transition state 500C depicts a transition state at about 55 seconds. After 55 seconds, all the devices in the first transition group 404A have transitioned their state. Between the third transition state 500C and a fourth transition state 500D, a signal to transition state is communicated to the second transition group 404B. At the fourth transition state 500D, which may be a final transition state, the device F5 in the second transition state has transitioned their state.

Figure 7A:
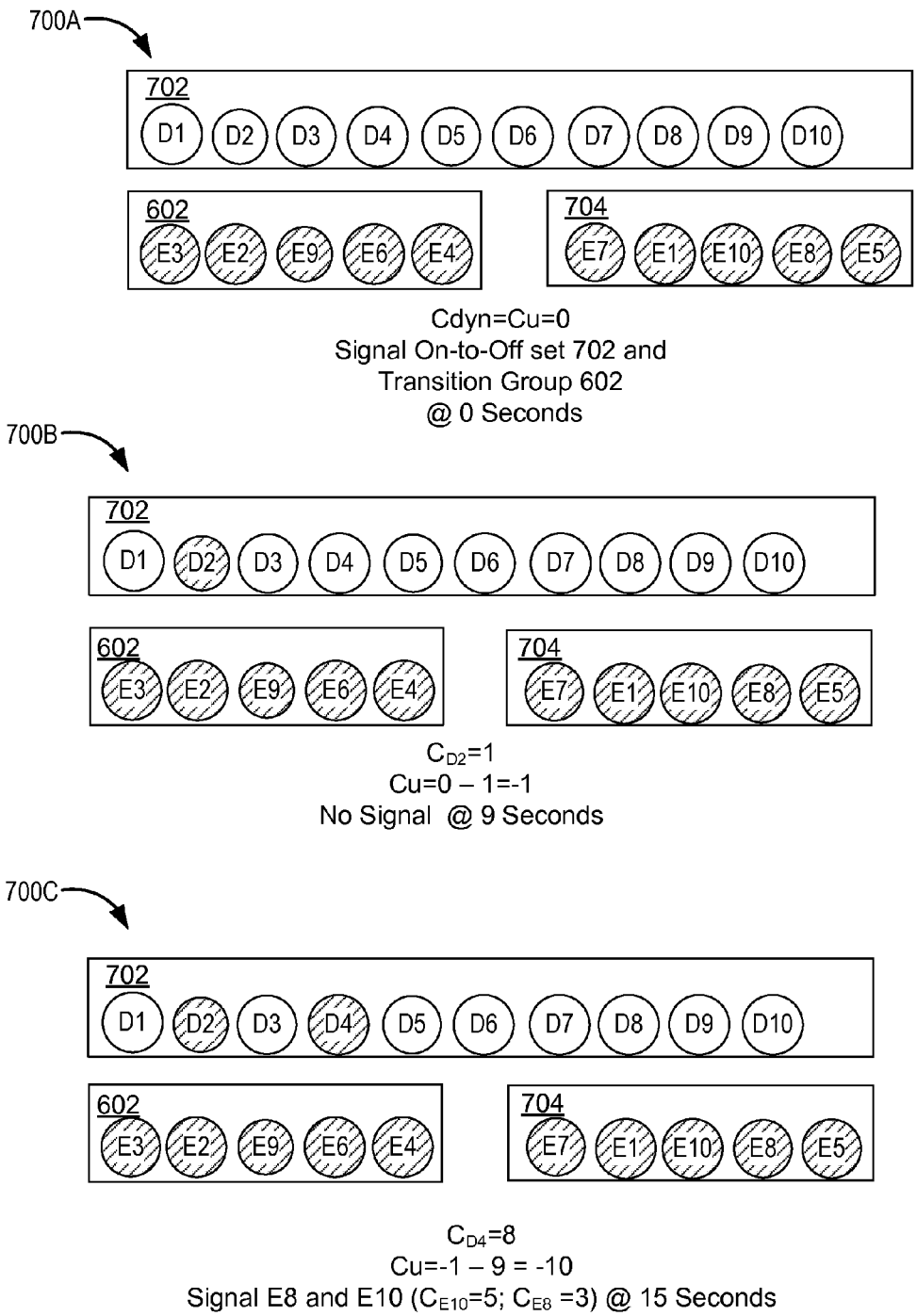
FIG. 7A depicts a portion of an example sequence of transition states according to the example portioning of FIG. 6.
Figure 7B:
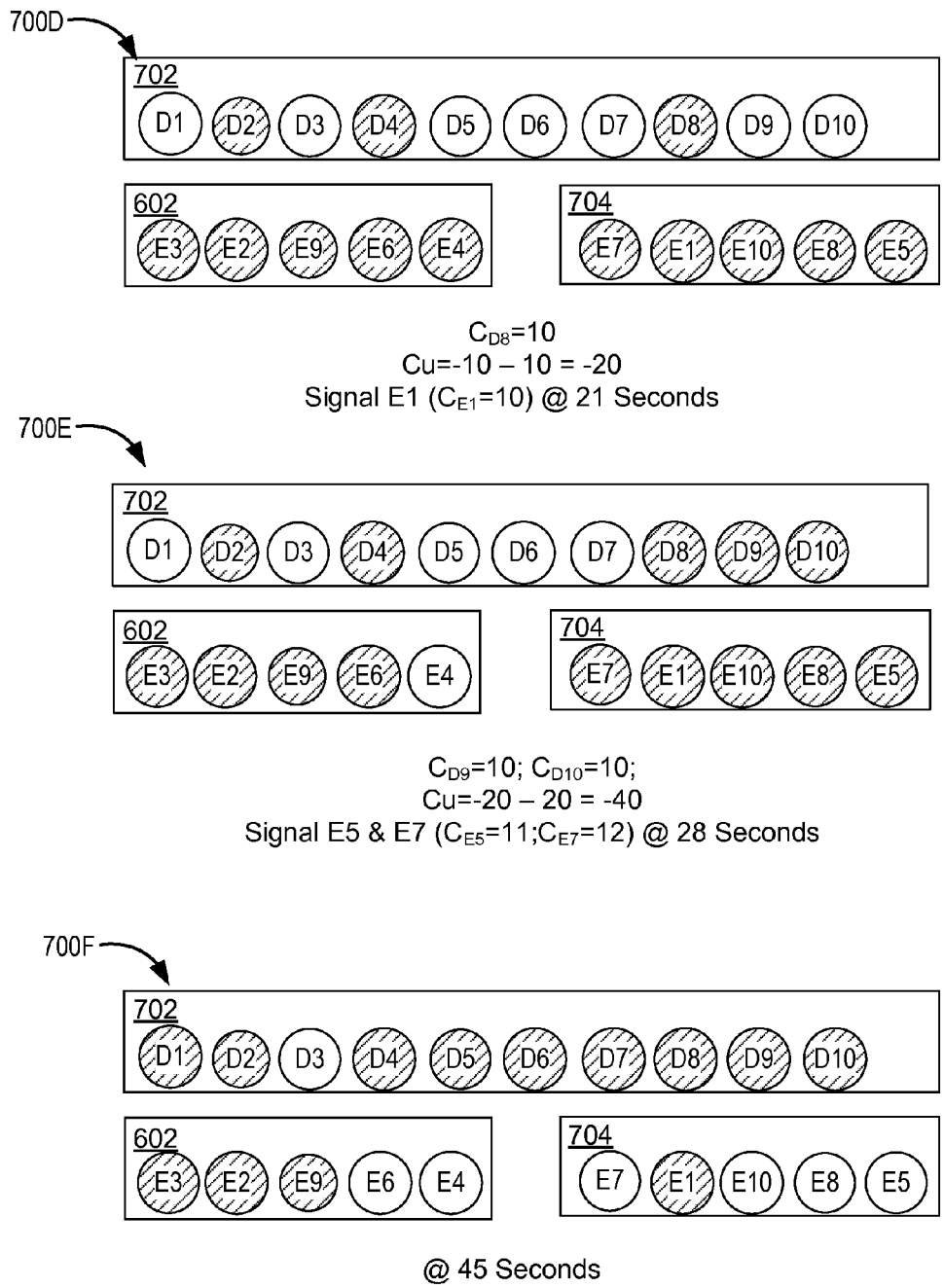
FIG. 7B depicts a portion of an example sequence of transition states according to the example portioning of FIG. 6.
Figure 7C:
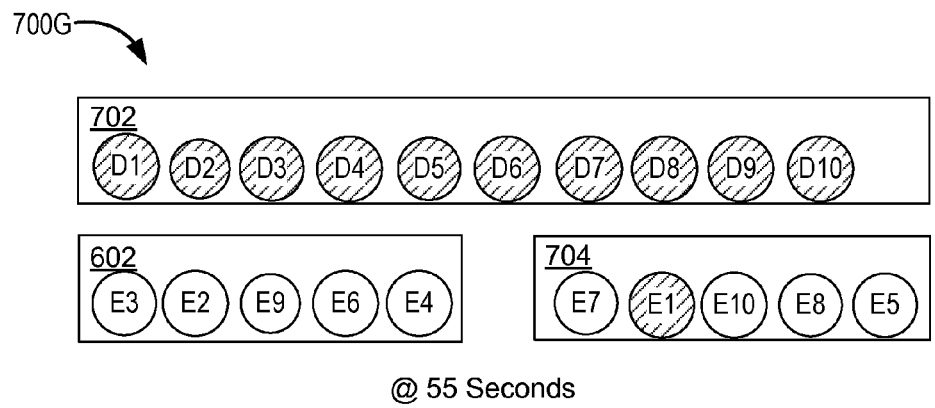
FIG. 7C depicts a portion of an example sequence of transition states according to the example portioning of FIG. 6.
Figure 7C:
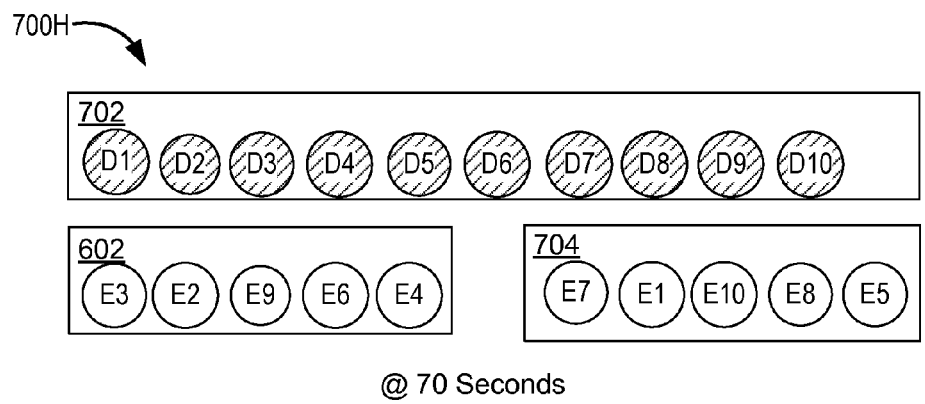

FIGS. 6-7C illustrate another example technique for execution of a micro DR event that may be implemented in the DR system 100 of FIG. 1. FIG. 6 depicts tables 600A and 600B that present an example portioning of an example collection of the devices D1-D10 and E1-E10. FIGS. 7A-7C depict a sequence of transition states 700A-700H according to the portioning of FIG. 6.

With reference to FIG. 6, the collection of the devices D1-D10 and E1-E10 may be separated into the On-to-Off set, which is depicted in the table 600A and the Off-to-On set, which is depicted in the table 600B. The tables 600A and 600B include the categories latency, curtailment capacity, and device ID that apply to the devices D1-D10 and E1-E10 as discussed elsewhere herein.

In the example depicted in FIGS. 6-7C, a curtailment margin may include 20. In addition, the curtailment margin may include a dynamic curtailment margin. The dynamic curtailment margin may be initialized to zero. Subsequently, the dynamic curtailment margin may be configured to be updated in response to a reception of a confirmation indicating a state transition during execution of one or more micro DR events. The update to the dynamic curtailment margin may include adding a particular curtailment capacity of the device (e.g., E1-E10) that has completed a state transition.

In some embodiments, the dynamic curtailment margin may be updated according to an example updating equation:

$$C_U = C_{dyn} - C_d$$

In the updating equation, the parameter $C_U$ represents an updated dynamic curtailment margin. The parameter $C_{dyn}$ represents a dynamic curtailment margin. The parameter $C_d$ represents a particular curtailment capacity of one of the devices (E1-E10), which is referred to as a device curtailment. For example, the device E3 may include a device curtailment of six and the device E1 may include a device curtailment of 11.

In the example described with reference to FIGS. 6-7C, all the devices D1-D10 in the On-to-Off set 600A may be signaled concurrently with a transition group 602. To portion the devices E1-E10 into the transition group 602, the devices E1-E10 may be sorted by latency. In some embodiments, the devices E1-E10 may be sorted in non-increasing order by latency as illustrated in FIG. 6. The transition group 602 may include one or more of the devices E1-E10 from the sorted Off-to-On set starting at the device having a highest latency (e.g., E3 in the depicted example) until an aggregate device curtailment of the devices E1-E10 in the transition group 602 exceeds the curtailment margin (in the depicted example, 20). In addition, the transition group 602 may omit one or more of the devices E1-E10 from the sorted Off-to-On set. For example, the devices E1-E10 having a device curtailment that when added to the transition group 602 increases the aggregate curtailment of the transition group 602 above the curtailment margin may be omitted.

For example, the transition group 602 may include the devices E3 and E2 because the aggregate curtailment capacity of the devices E3 and E2 is 12, which is less than the curtailment margin of 20. Addition of the device E1 may be considered next. However, addition of the device E1 may result in an aggregate curtailment of 23, which exceeds the curtailment margin of 20. Accordingly, the device E1 may be omitted. The devices E9 and then E6 may be considered next. Addition of the devices E9 and E6 may result in an aggregate curtailment of 18, which is less than the curtailment margin of 20. Thus, the devices E9 and E6 may be added to the transition group 602. The device E10 may be considered next. However, inclusion of the device E10 may result in an aggregate curtailment of 23, which exceeds the curtailment margin of 20. Accordingly, the device E10 may be omitted.

In addition to the transition group 602, one or more devices E1-E10 may be identified from the sorted Off-to-On set of the table 600B. The devices E1-E10 may be identified based on the dynamic curtailment margin and/or a latest updated value thereof. For example, the transition group 602 and the devices D1-D10 may be initially signaled to transition their states. Following some period of time, one or more of the devices D1-D10 may begin to transition their states, which may increase the dynamic curtailment margin. One or more of the devices E1-E10 not included in the transition group 602 may identified that has a device curtailment that is less than or equal to the updated dynamic curtailment margin. After the devices E1-E10 are identified, a signal may be communicated to the identified device to transition a state of the identified device.

In general, execution of a micro DR event may include communication of a signal to the devices (e.g., E3, E2, E9, E6, and E4) in the transition group 602 with the devices D1-D10 in the On-to-Off set. As confirmations are received indicating that one or more of the devices D1-D10 of the On-to-Off set and/or in the transition group 602 have transitioned their states, the dynamic curtailment margin may be updated to reflect the device curtailment of the device referred to in the confirmation. Another device in the Off-to-On set that is not included in the transition group 602 is identified that includes a device curtailment that is less than or equal to the updated dynamic curtailment margin. A signal may be sent to the identified devices (e.g., E6, E4, E7, E10, E8, and E5) to transition their states.

FIGS. 7A-7C depict the sequence of transition states 700A-700H according to the portioning of FIG. 6. Each of the transition states 700A-700H includes a time. The time indicates a duration between an initial signal being sent, which may be set at time=zero as depicted in a first transition state 700A. Each of the transition states 700A-700E includes a list of devices signaled and an updated dynamic curtailment. In FIGS. 7A-7C, the On-to-Off set is labeled with an item number 702. The devices (E7, E1, E10, E8, and E5) that are not included in the transition group 602 are labeled with an item number 704. These devices (E7, E1, E10, E8, and E5) are collectively referred to as a non-transition group 704. In each of the transition states 700A-700H, the indicators that are white designate devices in an On state. The indicators that include a diagonal-lined fill designate devices in an Off state.

With reference to FIG. 7A, in the first transition state 700A, an On-to-Off set 702 are in an On state and the transition group 602 and the non-transition group 704 are in an Off state. The first transition state 700A may occur at time=zero. At the first transition state 700A, the transition group 602 and the On-to-Off set 702 may be signaled. Additionally, the dynamic curtailment (Cdyn in FIGS. 7A-7C) may be equal to an updated curtailment (Cu in FIGS. 7A-7C), which may be equal to zero.

A second transition state 700B may occur at about time equal to about nine seconds. At about nine seconds, a confirmation may be received that the device D2 has transitioned its state. The device D2 may include a device curtailment ($C_{D2}$ in FIG. 7A) of one. The updated device curtailment may be updated to reflect the device curtailment of the device D2. In the second transition state 700B, none of the non-transition group 704 may include a device curtailment equal to or below the updated dynamic curtailment. Accordingly, no signal may be communicated to any of the non-transition group 704.

A third transition state 700C may occur at a time equal to about 15 seconds. At about 15 seconds, a confirmation may be received that the device D4 has transitioned its state. The device D4 may include a device curtailment ($C_{D4}$ in FIG. 7A) of eight. The updated device curtailment may be updated to reflect the device curtailment of the device D4. In the third transition state 700C, the devices E8 and E10 may be identified as having device curtailments equal to or below the updated dynamic curtailment. For example, the device curtailment of the device E8 ($C_{E8}$ in FIG. 7A) may be equal to three and the device curtailment of the device E10 ($C_{E10}$ in FIG. 7A) may be equal to five. The sum of the device curtailments of the devices E8 and E10 may be less than the updated dynamic curtailment. Accordingly, a signal may be communicated to the devices E10 and E8 to transition state.

With reference to FIG. 7B, a fourth transition state 700D may occur at about time equal to about 21 seconds. At about 21 seconds, a confirmation may be received that the device D8 has transitioned its state. The device D8 may include a device curtailment ($C_{D8}$ in FIG. 7A) of 10. The updated device curtailment may be updated to reflect the device curtailment of the device D8. In the fourth transition state 700D, the device E1 may be identified as having device curtailments equal to or below the updated dynamic curtailment. For example, the device curtailment of the device E1 ($C_{E1}$ in FIG. 7A) may be equal to 10, which may be less than the updated dynamic curtailment. Accordingly, a signal may be communicated to the device E1 to transition state.

With reference to FIG. 7B, the fourth transition state 700D may occur at about time equal to about 21 seconds. At about 21 seconds, a confirmation may be received that the device D8 has transitioned. The device D8 may include a device curtailment ($C_{D8}$ in FIG. 7A) of 10. The updated device curtailment may be updated to reflect the device curtailment of the device D8. In the fourth transition state 700D, the device E1 may be identified as having device curtailments equal to or below the updated dynamic curtailment. For example, the device curtailment of the device E1 ($C_{E1}$ in FIG. 7A) may be equal to 10, which may be less than the updated dynamic curtailment. Accordingly, a signal may be communicated to the device E1 to transition state.

A fifth transition state 700E may occur at about time equal to about 28 seconds. At about 28 seconds, confirmations may be received that the devices D9 and D10 have transitioned. The devices D9 and D10 may include device curtailments ($C_{D9}$ and $C_{D10}$ in FIG. 7A) of 10 each. The updated device curtailment may be updated to reflect the device curtailments of the devices D9 and D10. In the fifth transition state 700E, the devices E5 and E7 may be identified as having device curtailments equal to or below the updated dynamic curtailment. For example, the device curtailment of the device E5 ($C_{E5}$ in FIG. 7A) may be equal to 11 and the device E7 ($C_{E7}$ in FIG. 7A) may be equal to 12, which may be less than the updated dynamic curtailment. Accordingly, a signal may be communicated to the devices E5 and E7 to transition states.

At 28 seconds, each of the devices (E7, E1, E10, E8, and E5) may have been signaled. Accordingly, at transition states 700F of FIG. 7B and 700G and 700H of FIG. 7C, no signals may be sent to any devices. Each of the transition states 700F-700H depicts transitions of the remaining devices.

Figure 8:
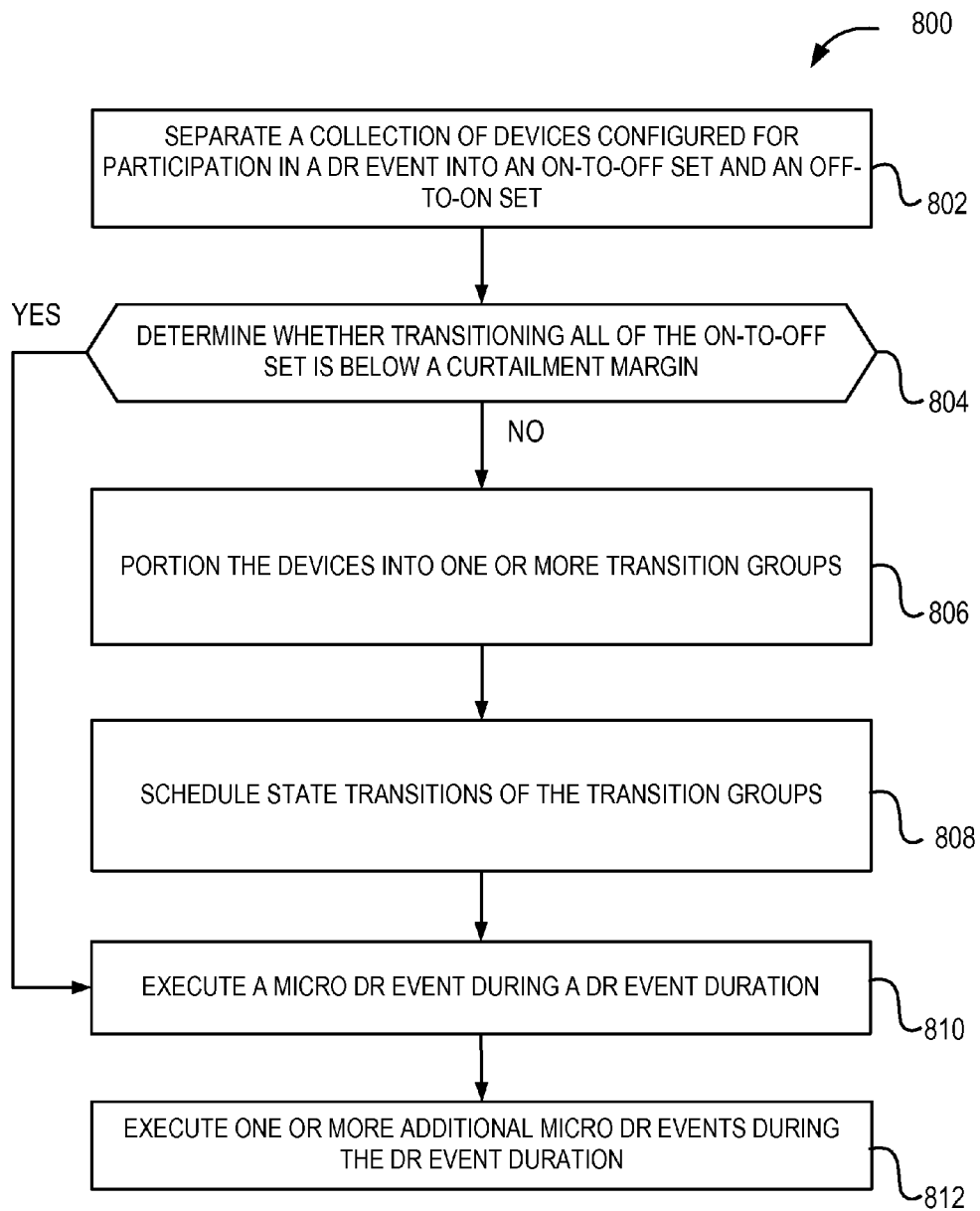
FIG. 8 is a flow diagram of an example method of executing a macro DR event.

FIG. 8 is a flow diagram of an example method 800 of executing a macro DR event, arranged in accordance with at least one embodiment described herein. The method 800 may be performed in a DR system such as the DR system 100 of FIG. 1 in which the utility 104 provides energy to the sites 130. Similar methods may be implemented with necessary modifications in systems in which other resources are provided by the utility 104.

The method 800 may be programmably performed in some embodiments by the DR server 106 described with reference to FIG. 1. In some embodiments, the DR server 106 or another computing device may include or may be communicatively coupled to a non-transitory computer-readable medium (e.g., the memory 132 of FIG. 1) having stored thereon programming code or instructions that are executable by a processor (such as the processor 134 of FIG. 1) to cause a computing device and/or the DR server 106 to perform the method 800. Additionally or alternatively, the DR server 106 may include the processor 134 described above that is configured to execute computer instructions to cause the DR server 106 or another computing device to perform the method 800. Although illustrated as discrete blocks, various blocks may be divided into additional blocks, combined into fewer blocks, or eliminated, depending on the desired implementation.

The method 800 may begin at block 802. At block 802, a collection of devices configured for participation in the DR event may be separated into an On-to-Off set and an Off-to-On set. In some embodiments, the devices may be associated with multiple customers and may include one or more of air-conditioners (A/Cs), a water heater, a household appliance, and a pool pump. Additionally or alternatively, the devices may be enrolled in a DLC DR program or an EMS DR program.

At block 804, it may be determined whether transitioning the states of all of the On-to-Off set meets a curtailment margin. In response to the transitioning the states of all of the On-to-Off set being below a curtailment margin ("YES" at block 804), the method 800 may proceed to block 810. In response to the transitioning the states of all of the On-to-Off set being above a curtailment margin ("NO" at block 804), the method 800 may proceed to block 806.

At block 806, the devices may be portioned into one or more transition groups. In some embodiments, one or more of the devices of the On-to-Off set and/or one or more of the devices of the Off-to-On set may be portioned into transition groups. The portioning may be based at least partially on latency. The latency may include latency involved in command communication with one or more of the devices as well as latency involved in implementing a command and/or sending a confirmation.

At block 808, state transitions of the transition groups may be scheduled. For example, the state transitions may be scheduled such that an energy curtailment during the state transitions meets a curtailment margin of a total curtailment of the DR event. In some embodiments, the scheduling may include sequencing one or more of state transitions such that a first transition group formed of the On-to-Off set is transitioned prior to a second transition group formed of the Off-to-On set.

At block 810, a micro DR event may be executed during a DR event duration. The micro DR event may include the state transitions in which the devices in the transition groups are transitioned from a current state to an alternative state and the micro DR event curtails a particular curtailment amount that is a portion of a total energy curtailment for the DR event.

At block 812, one or more additional micro DR events may be executed during the DR event duration. For example, in some embodiments, each of the additional micro DR events includes additional state transitions in which the devices in the transition groups are transitioned between the current state to the alternative state. Additionally, each of the additional micro DR events curtails an additional curtailment amount and a sum of the additional curtailment amounts is about equal to the total energy curtailment for the DR event.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 9A:
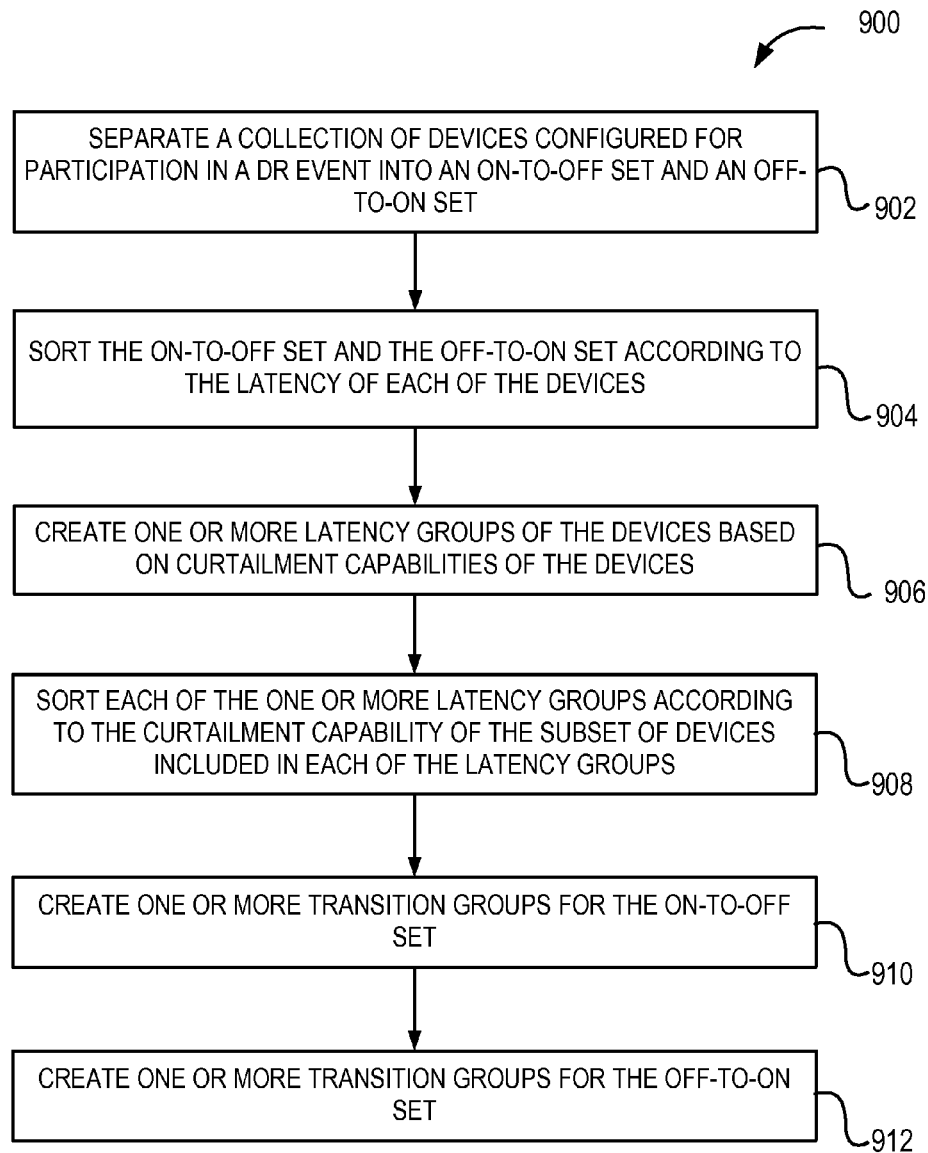
FIGS. 9A and 9B are a flow diagram of another example method of executing a macro DR event.
Figure 9B:
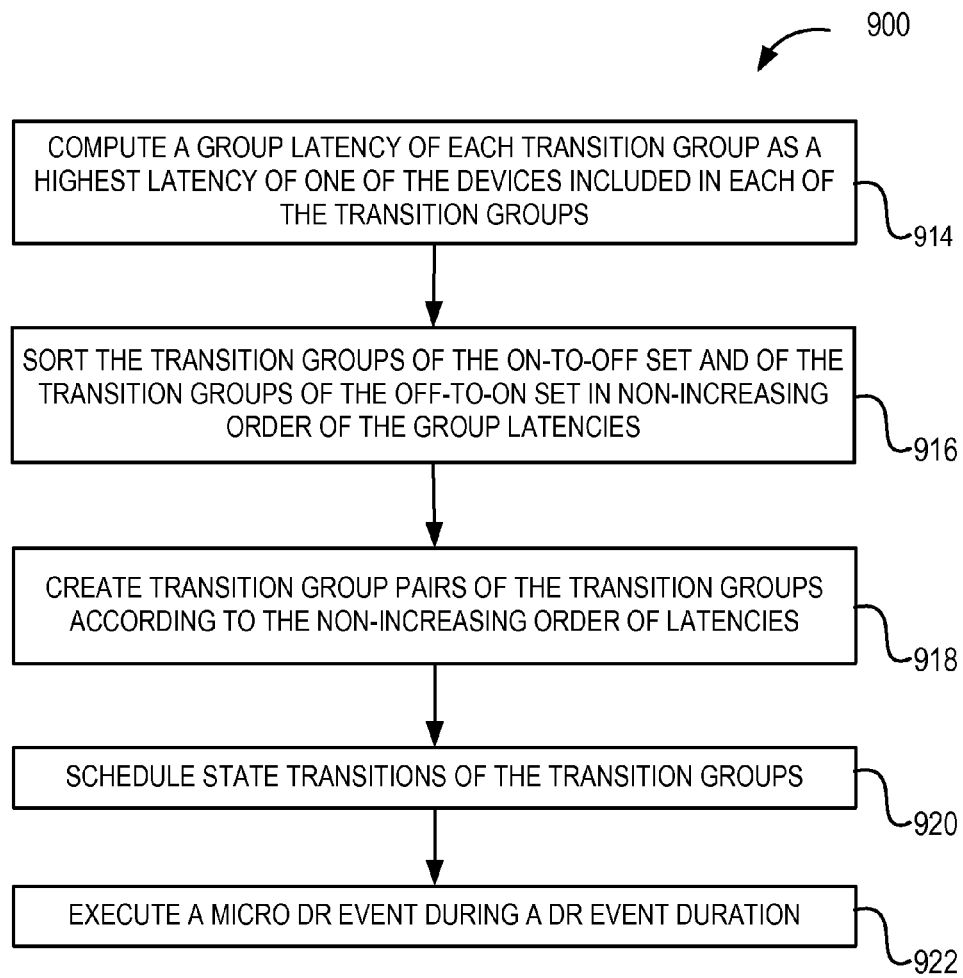

FIGS. 9A and 9B depict a flow diagram of another example method 900 of executing a macro DR event, arranged in accordance with at least one embodiment described herein. The method 900 may be performed in a DR system such as the DR system 100 of FIG. 1 in which the utility 104 provides energy to the sites 130. Similar methods may be implemented with necessary modifications in systems in which other resources are provided by the utility 104.

The method 900 may be programmably performed in some embodiments by the DR server 106 described with reference to FIG. 1. In some embodiments, the DR server 106 or another computing device may include or may be communicatively coupled to a non-transitory computer-readable medium (e.g., the memory 132 of FIG. 1) having stored thereon programming code or instructions that are executable by a processor (such as the processor 134 of FIG. 1) to cause a computing device and/or the DR server 106 to perform the method 900. Additionally or alternatively, the DR server 106 may include the processor 134 described above that is configured to execute computer instructions to cause the DR server 106 or another computing device to perform the method 900. Although illustrated as discrete blocks, various blocks may be divided into additional blocks, combined into fewer blocks, or eliminated, depending on the desired implementation.

With reference to FIG. 9A, the method 900 may begin at block 902. At block 902, a collection of devices configured for participation in the DR event may be separated into the On-to-Off set and the Off-to-On set. At block 904, the On-to-Off set and the Off-to-On set may be sorted according to the latency of each of the devices.

At block 906, one or more latency groups of the devices may be created based on curtailment capabilities of the devices. In some embodiments, the devices are added to each of the latency groups until a sum of the curtailment capabilities of each subset of devices included in one or more of the latency groups is greater than or equal to the curtailment margin. At block 908, each of the one or more latency groups may be sorted according to the curtailment capability of the subset of devices included in each of the latency groups.

At block 910, one or more transition groups may be created for the On-to-Off set. In some embodiments, devices may be added to the one or more of the transition groups such that a sum of the curtailment capabilities of each transition group approaches the curtailment margin but does not exceed the curtailment margin. At block 912, one or more transition groups may be created for the Off-to-On set. In some embodiments, devices are added to one or more of the transition groups until a sum of the curtailment capabilities of each transition group exceeds the curtailment margin.

In some embodiments, blocks 910 and/or 912 may be included as sub-steps or additional steps in portioning the devices of the On-to-Off set and/or the Off-to-On set into transition groups. For example, with reference to FIG. 8, blocks 910 and/or 912 may be included in block 806.

With reference to FIG. 9B, at block 914, a group latency may be computed for each transition group as a highest latency of one of the devices included in each of the transition groups. At block 916, the transition groups of the On-to-Off set and of the transition groups of the Off-to-On set may be sorted in non-increasing order of the group latencies. At block 918, transition group pairs of the transition groups may be created. The transition group pairs may be created according to the non-increasing order of latencies. In some embodiments, one or more of the group transition pairs may include one of the transition groups of the On-to-Off set and one of the transition groups of the Off-to-On set.

At block 920, state transitions of the transition groups may be scheduled. For instance, the state transitions may be scheduled such that an energy curtailment during the state transitions meets a curtailment margin of a total curtailment of the DR event. At block 922, a micro DR event may be executed during a DR event duration. In some embodiments, the executing the micro DR event may include communicating to all of the devices in a first pair of the transition group pairs a transition signal and following a transition in state of all of the devices in the first transition group pair, signaling a second transition group pair.

Figure 10:
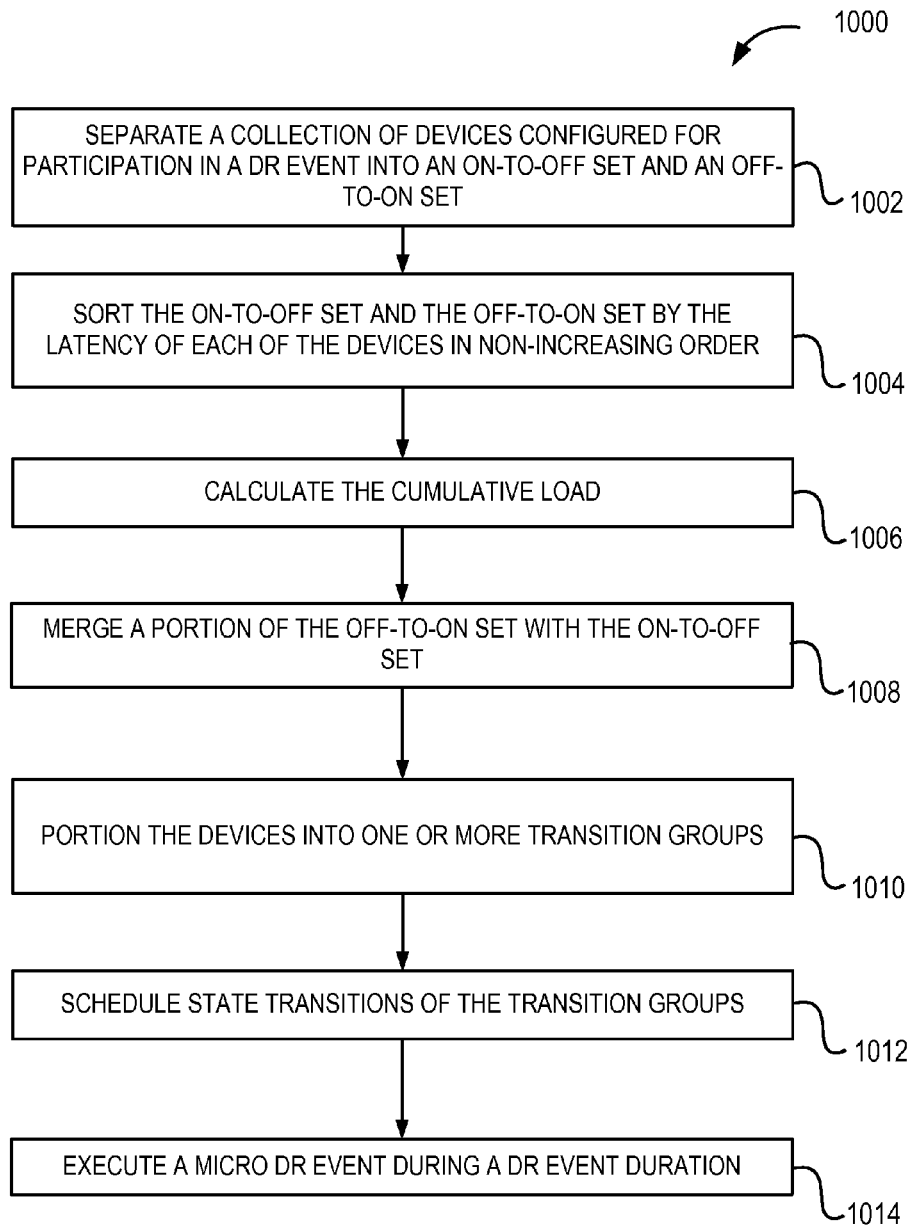
FIG. 10 is a flow diagram of another example method of executing a macro DR event.

FIG. 10 depicts a flow diagram of another example method 1000 of executing a macro DR event, arranged in accordance with at least one embodiment described herein. The method 1000 may be performed in a DR system such as the DR system 100 of FIG. 1 in which the utility 104 provides energy to the sites 130. Similar methods may be implemented with necessary modifications in systems in which other resources are provided by the utility 104.

The method 1000 may be programmably performed in some embodiments by the DR server 106 described with reference to FIG. 1. In some embodiments, the DR server 106 or another computing device may include or may be communicatively coupled to a non-transitory computer-readable medium (e.g., the memory 132 of FIG. 1) having stored thereon programming code or instructions that are executable by a processor (such as the processor 134 of FIG. 1) to cause a computing device and/or the DR server 106 to perform the method 1000. Additionally or alternatively, the DR server 106 may include the processor 134 described above that is configured to execute computer instructions to cause the DR server 106 or another computing device to perform the method 1000. Although illustrated as discrete blocks, various blocks may be divided into additional blocks, combined into fewer blocks, or eliminated, depending on the desired implementation.

The method 1000 may begin at block 1002. At block 1002, a collection of devices configured for participation in the DR event may be separated into the On-to-Off set and the Off-to-On set. At block 1004, the On-to-Off set and the Off-to-On set may be sorted by the latency of each of the devices in non-increasing order. At block 1006, the cumulative load may be calculated. For example, the cumulative load may be calculated up to and including each of the devices beginning at a device including a lowest latency.

At block 1008, a portion of the Off-to-On set may be merged with the On-to-Off set. The portion of the Off-to-On set merged with the On-to-Off set may include a maximum number of devices in the Off-to-On set such that state transitions of a merged set including the portion of the Off-to-On set with the On-to-Off set does not exceed the curtailment margin. At block 1010, the devices may be portioned into one or more transition groups. In some embodiments, one or more of the devices of the On-to-Off set and/or one or more of the devices of the Off-to-On set may be portioned into transition groups. The portioning may be based at least partially on latency. The latency may include latency involved in command communication with one or more of the devices as well as latency involved in implementing a command and/or sending a confirmation.

At block 1012, state transitions of the transition groups may be scheduled. For instance, the state transitions of the transition groups may be scheduled such that an energy curtailment during the state transitions meets a curtailment margin of a total curtailment of the DR event. At block 1014, a micro DR event may be executed during a DR event duration. In some embodiments, the micro DR event may include signaling all devices in the On-to-Off set and the devices included in the portion of the Off-to-On set merged with the On-to-Off set and following transition state completion, signaling a portion of the Off-to-On set not merged with the On-to-Off set.

Figure 11A:
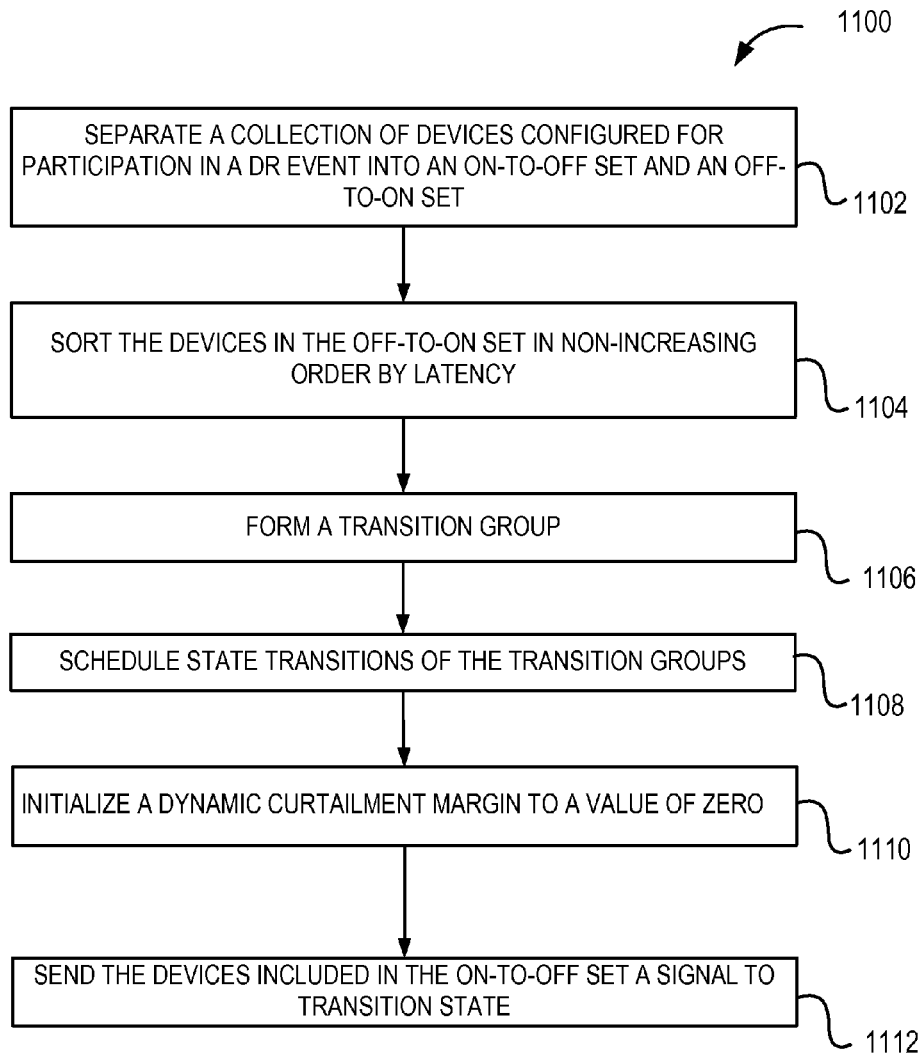
FIGS. 11A and 11B are a flow diagram of another example method of executing a macro DR event, all arranged in accordance with at least one embodiment described herein.
Figure 11B:
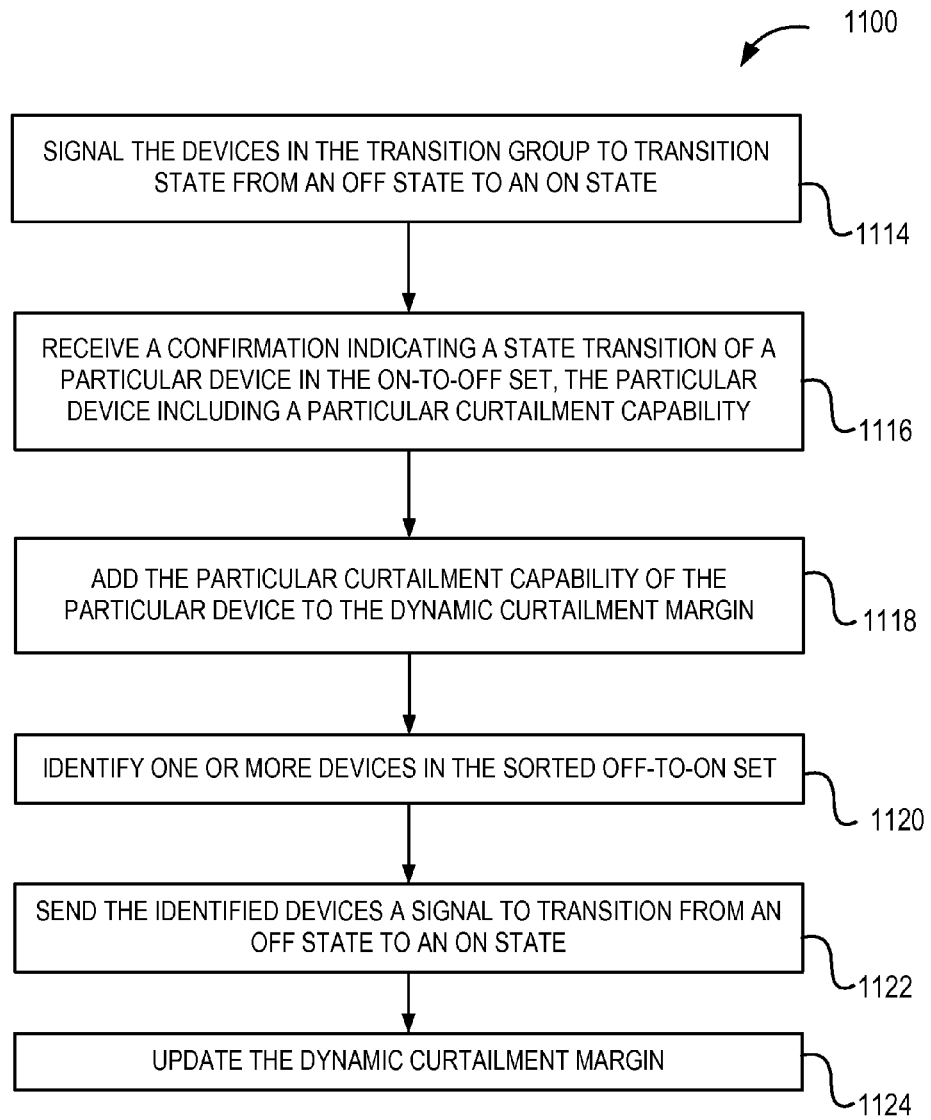

FIGS. 11A and 11B depict a flow diagram of another example method 1100 of executing a macro DR event, arranged in accordance with at least one embodiment described herein. The method 1100 may be performed in a DR system such as the DR system 100 of FIG. 1 in which the utility 104 provides energy to the sites 130. Similar methods may be implemented with necessary modifications in systems in which other resources are provided by the utility 104.

The method 1100 may be programmably performed in some embodiments by the DR server 106 described with reference to FIG. 1. In some embodiments, the DR server 106 or another computing device may include or may be communicatively coupled to a non-transitory computer-readable medium (e.g., the memory 132 of FIG. 1) having stored thereon programming code or instructions that are executable by a processor (such as the processor 134 of FIG. 1) to cause a computing device and/or the DR server 106 to perform the method 1100. Additionally or alternatively, the DR server 106 may include the processor 134 described above that is configured to execute computer instructions to cause the DR server 106 or another computing device to perform the method 1100. Although illustrated as discrete blocks, various blocks may be divided into additional blocks, combined into fewer blocks, or eliminated, depending on the desired implementation.

With reference to FIG. 11A, the method 1100 may begin at block 1102. At block 1102, a collection of devices configured for participation in the DR event may be separated into the On-to-Off set and the Off-to-On set. At block 1104, sorting the devices in the Off-to-On set in non-increasing order by latency.

At block 1106, forming the transition group. In some embodiments, the transition group may include one or more of the devices from the sorted Off-to-On set and may omit one or more of the devices from the sorted Off-to-On set. For example, the devices from the Off-to-On group may be included starting at the device having a highest latency. The devices from the Off-to-On group may be added to the transition group until an aggregate curtailment of the devices in the transition group exceeds the curtailment margin. Additionally, the devices from the Off-to-On group having a device curtailment that when added to the transition group increases the aggregate curtailment of the transition group above the curtailment margin may be omitted.

In some embodiments, blocks 1104 and/or 1106 may be included as sub-steps or additional steps in portioning the devices of the On-to-Off set and/or the Off-to-On set into transition groups. For example, with reference to FIG. 8, blocks 1104 and/or 1106 may be included in block 806.

At block 1108, state transitions of the transition groups may be scheduled. For example, the state transitions may be scheduled such that an energy curtailment during the state transitions meets a curtailment margin of a total curtailment of the DR event. The curtailment margin may include a dynamic curtailment margin. At block 1110, a dynamic curtailment margin may be initialized to a value of zero. At block 1112, the devices included in the On-to-Off set may be sent a signal to transition state.

With reference to FIG. 11B, at block 1114, the devices in the transition group may be signaled to transition state from an Off state to an On state. At block 1116, a confirmation indicating a state transition of a particular device in the On-to-Off set may be received. The particular device may include a particular curtailment capability.

At block 1118, the particular curtailment capability of the particular device may be added to the dynamic curtailment margin. At block 1120, one or more devices may be identified in the sorted Off-to-On set. For example, in response to an addition of the particular curtailment capability to the dynamic curtailment margin, one or more devices may be identified that are included in the sorted Off-to-On set and not included in the transition group. The devices may be identified such that the curtailment capacity of the identified device is less than the dynamic curtailment margin.

At block 1122, the identified devices may be sent a signal to transition from an Off state to an On state. At block 1124, the dynamic curtailment margin may be updated. For example, the dynamic curtailment margin may be updated according to an equation $C_u = C_{dyn} - C_d$, in which $C_u$ represents an updated dynamic curtailment margin, $C_{dyn}$ represents a dynamic curtailment margin, and $C_d$ represents a device curtailment.

In some embodiments, blocks 1110, 1112, 1114, 1116, 1118, 1120, 1122, 1124, or some combination thereof may be included as sub-steps or additional steps in executing a micro DR event. For example, with reference to FIG. 8, blocks 1110, 1112, 1114, 1116, 1118, 1120, 1122, 1124, or some combination thereof may be included in block 812.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method, comprising:
 separating a collection of devices configured for participation in a Demand Response (DR) event into an On-to-Off DR device set ("On-to-Off set") and an Off-to-On DR device set ("Off-to-On set");
 portioning into one or more transition groups, one or more devices of the On-to-Off set and/or one or more devices of the Off-to-On set, the portioning being based at least partially on latency involved in command communication with each device of the one or more of the devices, the latency including a delay in a signal communication to the device and a time for a state of the device to transition following reception of a signal to transition;

scheduling state transitions of the transition groups such that an energy curtailment during the state transitions meets a curtailment margin of a total curtailment of the DR event; and executing, during a DR event duration, a micro DR event that includes the state transitions in which the devices in the transition groups are transitioned from a current state to an alternative state and in which the micro DR event curtails a particular curtailment amount that is a portion of a total energy curtailment for the DR event.

2. The method of claim 1, further comprising during the DR event duration, executing one or more additional micro DR events, wherein:

each of the additional micro DR events includes additional state transitions in which the devices in the transition groups are transitioned between the current state to the alternative state, each of the additional micro DR events curtails an additional curtailment amount, a sum of the additional curtailment amounts is about equal to the total energy curtailment for the DR event, and the scheduling includes sequencing one or more of state transitions such that a first transition group formed of the On-to-Off set is transitioned prior to a second transition group formed of the Off-to-On set.

3. The method of claim 1, wherein:

the devices are associated with multiple customers and include one or more of an air-conditioner (A/C), a water heater, a household appliance, a piece of industrial equipment, a refrigerator, a fan, a freezer, a heater, a ventilation unit, a thermostatically controlled unit, an appliance charging device, an electric vehicle charging device, a pool pump, and a pool heater, and the devices are enrolled in a Direct Load Control (DLC) DR program or an Energy Management System (EMS) DR program.

4. The method of claim 1, further comprising:

sorting the On-to-Off set and the Off-to-On set according to the latency of each of the devices;

creating one or more latency groups of the devices based on curtailment capabilities of the devices, wherein the devices are added to each of the latency groups until a sum of the curtailment capabilities of each subset of devices included in one or more of the latency groups is greater than or equal to the curtailment margin; and sorting each of the one or more latency groups according to the curtailment capability of the subset of devices included in each of the latency groups.

5. The method of claim 4, wherein the portioning includes:

for the On-to-Off set, creating one or more transition groups, wherein the devices are added to one or more of the transition groups such that a sum of the curtailment capabilities of each transition group approaches the curtailment margin but does not exceed the curtailment margin; and for the Off-to-On set, creating one or more transition groups, wherein devices are added to one or more of the transition groups until a sum of the curtailment capabilities of each transition group exceeds the curtailment margin.

6. The method of claim 5, further comprising:

determining which device of the devices included in each of the transition groups has a highest latency;

computing a group latency of each transition group as the highest latency of the devices included in each of the transition groups;

sorting the transition groups of the On-to-Off set and of the transition groups of the Off-to-On set in non-increasing order of the group latencies; and creating transition group pairs of the transition groups according to the non-increasing order of latencies, one or more of the group transition pairs including one of the transition groups of the On-to-Off set and one of the transition groups of the Off-to-On set, wherein the executing the micro DR event includes communicating to all of the devices in a first transition group pair of the transition group pairs a transition signal and following a transition in state of all of the devices in the first transition group pair, signaling a second transition group pair of the transition group pairs.

7. The method of claim 1, further comprising:

sorting the On-to-Off set and the Off-to-On set by the latency of each of the devices in non-increasing order;

determining which device of the devices included in the On-to-Off set and in the Off-to-On set in each of the transition groups has a lowest latency;

calculating a cumulative load up to and including each of the devices beginning at the device having the lowest latency; and merging a portion of the Off-to-On set with the On-to-Off set to include a maximum number of devices in the Off-to-On set such that state transitions of a merged set including the portion of the Off-to-On set with the On-to-Off does not exceed the curtailment margin.

8. The method of claim 7, wherein the executing includes signaling all devices in the On-to-Off set and the devices included in the portion of the Off-to-On set merged with the On-to-Off set and following transition state completion, signaling a portion of the Off-to-On set not merged with the On-to-Off set.

9. The method of claim 1, wherein:

the curtailment margin includes a dynamic curtailment margin; and the portioning includes:

sorting the devices in the Off-to-On set in non-increasing order by the latency; and forming the transition group, wherein the transition group includes one or more devices from the sorted Off-to-On set starting at the device having a highest latency until an aggregate curtailment of the devices in the transition group exceeds the curtailment margin and omits one or more of the devices from the sorted Off-to-On set with a device curtailment of the device when added to the transition group increases the aggregate curtailment of the transition group above the curtailment margin.

10. The method of claim 9, wherein the executing includes:

initializing a dynamic curtailment margin to a value of zero;

sending the devices included in the On-to-Off set a signal to transition state;

signaling the devices in the transition group to transition state from an Off state to an On state;

receiving a confirmation indicating a state transition of a particular device in the On-to-Off set, the particular device including a particular curtailment capability;

adding the particular curtailment capability of the particular device to the dynamic curtailment margin;

in response to an addition of the particular curtailment capability to the dynamic curtailment margin, identifying one or more devices in the sorted Off-to-On set and not included in the transition group such that the curtailment capacity of the identified device is less than the dynamic curtailment margin;

sending the identified devices a signal to transition from an Off state to an On state; and updating the dynamic curtailment margin according to an equation $C_u = C_{dyn} - C_d$, in which:

$C_u$ represents an updated dynamic curtailment margin,
$C_{dyn}$ represents a dynamic curtailment margin, and
$C_d$ represents a device curtailment.

11. A non-transitory computer-readable medium having encoded therein programming code executable by a processor to perform operations comprising:

separating a collection of devices configured for participation in a Demand Response (DR) event into an On-to-Off DR device set ("On-to-Off set") and an Off-to-On DR device set ("Off-to-On set");

portioning into one or more transition groups one or more devices of the On-to-Off set and/or one or more devices of the Off-to-On set, the portioning being based at least partially on latency involved in command communication with each device of the one or more of the devices, the latency including a delay in a signal communication to the device and a time for a state of the device to transition following reception of a signal to transition;

scheduling state transitions of the transition groups such that an energy curtailment during the state transitions meets a curtailment margin of a total curtailment of the DR event; and executing, during a DR event duration, a micro DR event that includes the state transitions in which the devices in the transition groups are transitioned from a current state to an alternative state and in which the micro DR event curtails a particular curtailment amount that is a portion of a total energy curtailment for the DR event.

12. The non-transitory computer-readable medium of claim 11, wherein:

the operations further comprise executing one or more additional micro DR events during the DR event duration, each of the additional micro DR events includes additional state transitions in which the devices in the transition groups are transitioned between the current state to the alternative state, each of the additional micro DR events curtails an additional curtailment amount, a sum of the additional curtailment amounts is about equal to the total energy curtailment for the DR event, and the scheduling includes sequencing one or more of state transitions such that a first transition group formed of the On-to-Off set is transitioned prior to a second transition group formed of the Off-to-On set.

13. The non-transitory computer-readable medium of claim 11, wherein:

the devices are associated with multiple customers and include one or more of an air-conditioner (A/C), a water heater, a household appliance, a piece of industrial equipment, a refrigerator, a fan, a freezer, a heater, a ventilation unit, a thermostatically controlled unit, an appliance charging device, an electric vehicle charging device, a pool pump, and a pool heater, and the devices are enrolled in a Direct Load Control (DLC) DR program or an Energy Management System (EMS) DR program.

14. The non-transitory computer-readable medium of claim 11, wherein the operations further comprise:

sorting the On-to-Off set and the Off-to-On set according to the latency of each of the devices;

creating one or more latency groups of the devices based on curtailment capabilities of the devices, wherein the devices are added to each of the latency groups until a sum of the curtailment capabilities of each subset of devices included in one or more of the latency groups is greater than or equal to the curtailment margin; and sorting each of the one or more latency groups according to the curtailment capability of the subset of devices included in each of the latency groups.

15. The non-transitory computer-readable medium of claim 14, wherein portioning includes:

for the On-to-Off set, creating one or more transition groups, wherein the devices are added to one or more of the transition groups such that a sum of the curtailment capabilities of each transition group approaches the curtailment margin but does not exceed the curtailment margin; and for the Off-to-On set, creating one or more transition groups, wherein devices are added to one or more of the transition groups until a sum of the curtailment capabilities of each transition group exceeds the curtailment margin.

16. The non-transitory computer-readable medium of claim 15, wherein the operations further comprise:

determining which device of the devices included in each of the transition groups has a highest latency;

computing a group latency of each transition group as the highest latency of the devices included in each of the transition groups;

sorting the transition groups of the On-to-Off set and of the transition groups of the Off-to-On set in non-increasing order of the group latencies; and creating transition group pairs of the transition groups according to the non-increasing order of latencies, one or more of the group transition pairs including one of the transition groups of the On-to-Off set and one of the transition groups of the Off-to-On set, wherein the executing the micro DR event includes communicating to all of the devices in a first transition group pair of the transition group pairs a transition signal and following a transition in state of all of the devices in the first transition group pair, signaling a second transition group pair of the transition group pairs.

17. The non-transitory computer-readable medium of claim 11, wherein the operations further comprise:

sorting the On-to-Off set and the Off-to-On set by the latency of each of the devices in non-increasing order;

determining which device of the devices included in the On-to-Off set and in the Off-to-On set in each of the transition groups has a lowest latency;

calculating a cumulative load up to and including each of the devices beginning at the device having the lowest latency; and merging a portion of the Off-to-On set with the On-to-Off set to include a maximum number of devices in the Off-to-On set such that state transitions of a merged set including the portion of the Off-to-On set with the On-to-Off does not exceed the curtailment margin.

18. The non-transitory computer-readable medium of claim 17, wherein the executing includes signaling all devices in the On-to-Off set and the devices included in the portion of the Off-to-On set merged with the On-to-Off set and following transition state completion, signaling a portion of the Off-to-On set not merged with the On-to-Off set.

19. The non-transitory computer-readable medium of claim 11, wherein:
the curtailment margin includes a dynamic curtailment margin; and
the portioning includes:
sorting the devices in the Off-to-On set in non-increasing order by the latency; and
forming the transition group, wherein the transition group includes one or more devices from the sorted Off-to-On set starting at the device having a highest latency until an aggregate curtailment of the devices in the transition group exceeds the curtailment margin and omits one or more of the devices from the sorted Off-to-On set with a device curtailment of the device when added to the transition group increases the aggregate curtailment of the transition group above the curtailment margin.

20. The non-transitory computer-readable medium of claim 19, wherein the executing includes:
initializing a dynamic curtailment margin to a value of zero;
sending the devices included in the On-to-Off set a signal to transition state;
signaling the devices in the transition group to transition state from an Off state to an On state;
receiving a confirmation indicating a state transition of a particular device in the On-to-Off set, the particular device including a particular curtailment capability;
adding the particular curtailment capability of the particular device to the dynamic curtailment margin;
in response to an addition of the particular curtailment capability to the dynamic curtailment margin, identifying one or more devices in the sorted Off-to-On set and not included in the transition group such that the curtailment capacity of the identified device is less than the dynamic curtailment margin;
sending the identified devices a signal to transition from an Off state to an On state; and
updating the dynamic curtailment margin according to an equation $C_u = C_{dyn} - C_d$, in which:
$C_u$ represents an updated dynamic curtailment margin,
$C_{dyn}$ represents a dynamic curtailment margin, and
$C_d$ represents a device curtailment.

* * * * *